United States Patent
Maeyama

(10) Patent No.: US 9,538,091 B2
(45) Date of Patent: Jan. 3, 2017

(54) IMAGING APPARATUS, IMAGING SIGNAL PROCESSING CIRCUIT, IMAGING SIGNAL PROCESSING METHOD, DISPLAY APPARATUS, IMAGE SIGNAL PROCESSING CIRCUIT, AND IMAGE SIGNAL PROCESSING METHOD

(71) Applicant: JOLED INC., Tokyo (JP)

(72) Inventor: Koichi Maeyama, Kanagawa (JP)

(73) Assignee: JOLED Inc., Tokyo (JP)

( * ) Notice: Subject to any disclaimer, the term of this patent is extended or adjusted under 35 U.S.C. 154(b) by 120 days.

(21) Appl. No.: 14/526,674

(22) Filed: Oct. 29, 2014

(65) Prior Publication Data
US 2015/0172528 A1    Jun. 18, 2015

(30) Foreign Application Priority Data

Dec. 12, 2013 (JP) ................................ 2013-256599

(51) Int. Cl.
*H04N 5/235* (2006.01)
*H04N 5/355* (2011.01)
*H04N 5/232* (2006.01)

(52) U.S. Cl.
CPC .......... *H04N 5/2355* (2013.01); *H04N 5/3559* (2013.01); *H04N 5/35581* (2013.01); *H04N 5/23293* (2013.01)

(58) Field of Classification Search
CPC ...................................................... H04N 5/235
USPC ................................................... 348/332, 362
See application file for complete search history.

(56) References Cited

U.S. PATENT DOCUMENTS

| 5,317,334 A * | 5/1994 | Sano ..................... G09G 3/2022 345/41 |
| 2002/0015111 A1* | 2/2002 | Harada ................ H04N 5/2176 348/642 |

FOREIGN PATENT DOCUMENTS

| JP | 07-131796 A | 5/1995 |
| JP | 07-135599 A | 5/1995 |
| JP | 2010-276968 A | 12/2010 |

* cited by examiner

*Primary Examiner* — Joel Fosselman
(74) *Attorney, Agent, or Firm* — Michael Best & Friedrich LLP

(57) ABSTRACT

An imaging apparatus includes an imaging device which is able to individually set two or more types of exposure conditions with respect to arbitrary pixel groups inside an imaging area section and which reads out an imaging signal, which is obtained from pixel groups where the exposure conditions are individually set, in units of one imaging frame, and an imaging signal processing section which performs signal separation for each exposure condition and performs association with the exposure conditions with respect to the imaging signal which is output from the imaging device.

12 Claims, 23 Drawing Sheets

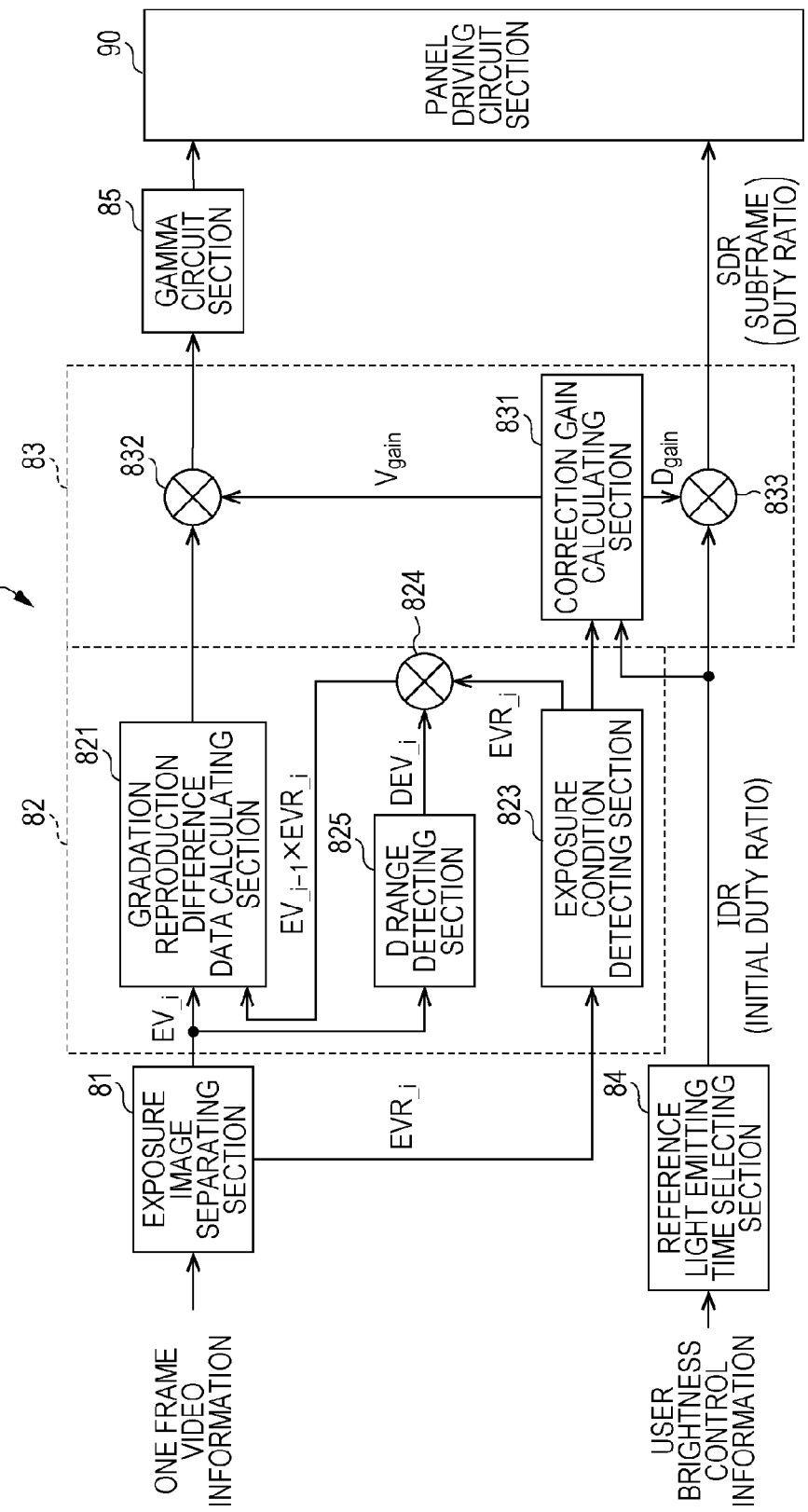

FIG. 12
(ODD NUMBERED FRAME)
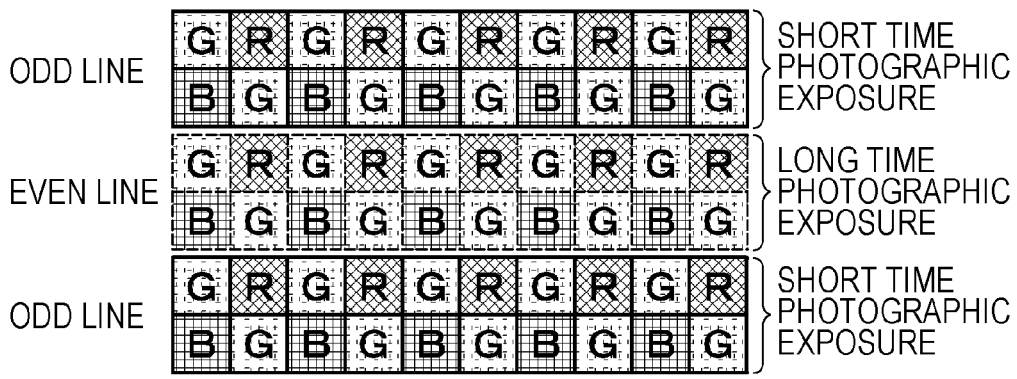
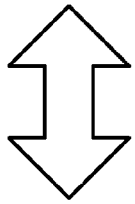
(EVEN NUMBERED FRAME)
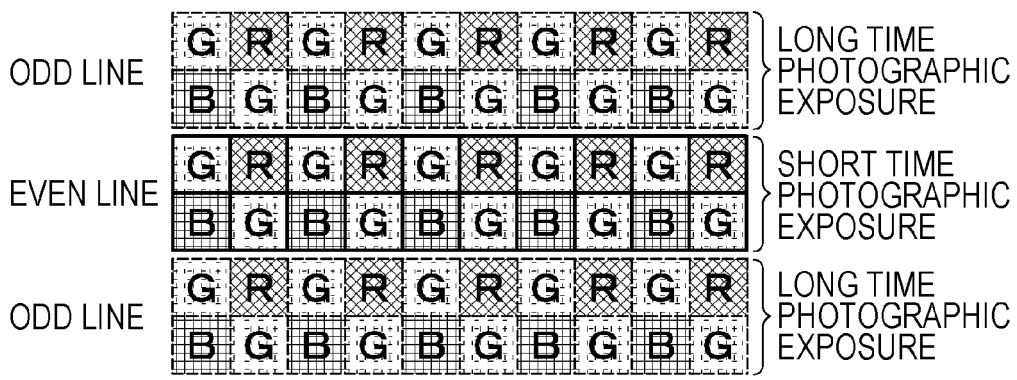

IMAGING APPARATUS, IMAGING SIGNAL PROCESSING CIRCUIT, IMAGING SIGNAL PROCESSING METHOD, DISPLAY APPARATUS, IMAGE SIGNAL PROCESSING CIRCUIT, AND IMAGE SIGNAL PROCESSING METHOD

CROSS REFERENCE TO RELATED APPLICATIONS

This application claims the benefit of Japanese Priority Patent Application JP 2013-256599 filed Dec. 12, 2013, the entire contents of which are incorporated herein by reference.

BACKGROUND

The present disclosure relates to an imaging apparatus, an imaging signal processing circuit, and an imaging signal processing method, in addition to a display apparatus, an image signal processing circuit, and an image signal processing method.

As a High Dynamic Range (HDR) technique, there is a method for synthesizing and processing a plurality of images which are captured by changing the exposure (a bright image, a normal image, a dark image, and the like) and then displaying the images by compressing the images to an amount of information which is able to be represented on a normal monitor (for example, refer to Japanese Unexamined Patent Application Publication No. 7-131796 and Japanese Unexamined Patent Application Publication No. 7-135599).

On the other hand, while capturing HDR video using an imaging apparatus such as a video camera, displaying the video in real time on a view monitor of a camera is important during the capturing of the film. In such a case, a method for displaying an HDR video in a simple manner by outputting a plurality of images, which divide a gradation representation range, in time series in sub-frame units and displaying the images at double speed was also proposed as one method for realizing a simple display (for example, refer to Japanese Unexamined Patent Application Publication No. 2010-276968).

SUMMARY

However, in the method described in Japanese Unexamined Patent Application Publication No. 7-131796 and Japanese Unexamined Patent Application Publication No. 7-135599, although it is possible to exhibit the effects to a certain extent when capturing still images, when performing synthesis relating to a moving subject in a case where a film or the like is captured, video ghosting is generated due to the influence of the time difference during capturing. A method for acquiring a plurality of exposed images in a batch by arranging light receiving elements (photosensors) with different sensitivities inside an imaging device may also be considered; however, since the positions of the light receiving elements are fixed, the degree of precision of the video at the time of acquisition is decreased.

On the other hand, with the method described in Japanese Unexamined Patent Application Publication No. 2010-276968, since there is a demand for the display panel to be capable of a double speed display or more, the cost of the system is increased since it is necessary to increase the driving frequency or the data transfer frequency of the display panel to be greater than in a case where this method is not adopted.

Therefore, the present disclosure has an object of providing an imaging apparatus, an imaging signal processing circuit, and an imaging signal processing method, in addition to a display apparatus, an image signal processing circuit, and an image signal processing method, which suppress the generation of video ghosting and are able to realize an HDR film display at low cost.

According to one embodiment of the present disclosure, there is provided an imaging apparatus of the present disclosure for achieving the object described above including an imaging device which is able to individually set two or more types of exposure conditions with respect to arbitrary pixel groups inside an imaging area section and which reads out an imaging signal, which is obtained from pixel groups where the exposure conditions are individually set, in units of one imaging frame, and an imaging signal processing section which performs signal separation for each exposure condition and performs association with the exposure conditions with respect to the imaging signal which is output from the imaging device.

According to another embodiment of the present disclosure, there is provided an imaging signal processing circuit of the present disclosure for achieving the object described above, which is for an imaging device which is able to individually set two or more types of exposure conditions with respect to arbitrary pixel groups inside an imaging area section, including a signal processing section which performs signal separation for each exposure condition and performs association with the exposure conditions with respect to an imaging signal which is obtained from pixel groups where exposure conditions are individually set and which is read out in units of one imaging frame.

According to still another embodiment of the present disclosure, there is provided an imaging signal processing method of the present disclosure for achieving the object described above for an imaging device which is able to individually set two or more types of exposure conditions with respect to arbitrary pixel groups inside an imaging area section, including performing signal separation for each exposure condition and performing association with the exposure conditions with respect to an imaging signal which is obtained from pixel groups where exposure conditions are individually set and which is read out in units of one imaging frame.

According to still another embodiment of the present disclosure, there is provided a display apparatus of the present disclosure for achieving the object described above including a sub-frame signal generating section which generates a video signal of a plurality of sub-frames which configure a video of one display frame, and a driving section which performs display with respect to a display panel using sub-frame units based on the video signal of a plurality of sub-frames generated in the sub-frame signal generating section, in which the sub-frame signal generating section inputs an imaging signal which is obtained from pixel groups where exposure conditions are individually set, which is signal separated for each exposure condition, and which is associated with the exposure conditions as an image signal of a processing target in units of one display frame, in an imaging device which is able to individually set two or more types of exposure conditions with respect to arbitrary pixel groups inside an imaging area section, and generates a video signal of sub-frames by controlling a light emitting time of a light emitting element for each sub-frame according to the associated exposure conditions.

According to still another embodiment of the present disclosure, there is provided an image signal processing circuit of the present disclosure for achieving the object described above including a sub-frame signal generating section which generates a video signal of a plurality of sub-frames which configure a video of one display frame, in which the sub-frame signal generating section inputs an imaging signal which is obtained from pixel groups where exposure conditions are individually set, which is signal separated for each exposure condition, and which is associated with the exposure conditions, as an image signal of a processing target in units of one display frame, in an imaging device which is able to individually set two or more types of exposure conditions with respect to arbitrary pixel groups inside an imaging area section, and generates a video signal of sub-frames by controlling a light emitting time of a light emitting element for each sub-frame according to the associated exposure conditions.

According to still another embodiment of the present disclosure, there is provided an image signal processing method of the present disclosure for achieving the object described above for an imaging device which is able to individually set two or more types of exposure conditions with respect to arbitrary pixel groups inside an imaging area section when generating a video signal with a plurality of sub-frames which configure a video of one display frame, including inputting an imaging signal which is obtained from pixel groups where exposure conditions are individually set, which is signal separated for each exposure condition, and which is associated with the exposure conditions, as an image signal of a processing target in units of one display frame, and generating a video signal of sub-frames by controlling a light emitting time of the light emitting element for each sub-frame according to the associated exposure conditions.

According to the embodiments of the present disclosure, by setting two or more types of exposure conditions with respect to arbitrary pixel groups and performing signal separation for each of the exposure conditions, it is possible to suppress the generation of video ghosting since a time difference is not generated between the acquired exposure images (the images which are captured under the individual exposure conditions). In addition, it is possible to realize an HDR film display at a low cost.

Here, the present disclosure is not necessarily limited to the effects described here and may have any of the effects described in the present specification. In addition, the effects which are described in the present specification are only illustrative and there may be additional effects without being limited to these effects.

BRIEF DESCRIPTION OF THE DRAWINGS

FIG. 7A shows characteristics of subject reflectivity-input video gradation value and FIG. 7B shows characteristics of subject reflectivity-output video gradation value.

FIG. 10 is a block diagram which shows a configuration of an image signal processing circuit according to embodiment 2.

FIG. 11A shows characteristics of subject reflectivity-image information and FIG. 11B shows characteristics of subject reflectivity-output video gradation value.

FIG. 12 is a diagram which shows reading out examples in a case where photographic exposure conditions are set using line units and the exposure conditions are switched using imaging frame units.

DETAILED DESCRIPTION OF EMBODIMENTS

Figure 1:
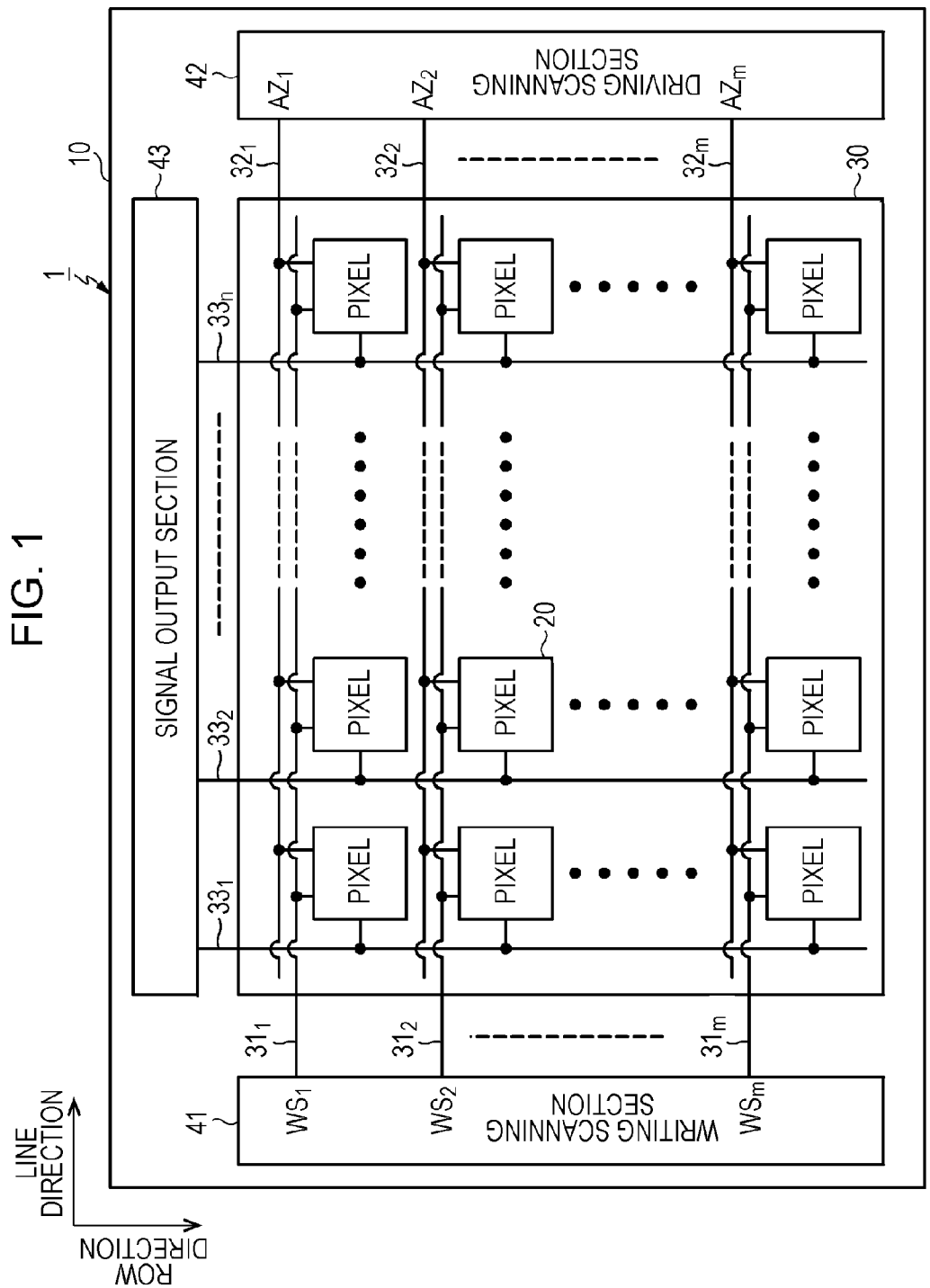
FIG. 1 is a system configuration diagram which shows a schematic of a basic configuration of an active matrix type display apparatus in which the technique of the present disclosure is applied.

Below, detailed description will be given of forms for realizing the technique of the present disclosure (described below as "Embodiments") using the drawings. The technique of the present disclosure is not limited to the embodiments and the various values and the like in the embodiments are only examples. In the following description, the same reference numerals are used for the same elements or elements which have the same function and overlapping description thereof will be omitted. Here, the description will be given in the following order.

1. Description relating to the imaging apparatus, imaging signal processing circuit, and imaging signal processing method of the present disclosure as a whole
2. Description relating to the display apparatus, image signal processing circuit, and image signal processing method of the present disclosure as a whole
3. Display apparatus of the present disclosure (a display apparatus in which the technique of the present disclosure is applied)
   3-1. System configuration
   3-2. Pixel circuit
4. Description of embodiments
   4-1. Imaging apparatus of the present disclosure (an imaging apparatus in which the technique of the present disclosure is applied)
   4-2. Embodiment 1
   4-3. Embodiment 2
   4-4. Embodiment 3
   4-5. Embodiment 4
   4-6. Embodiment 5

Description relating to the imaging apparatus, imaging signal processing circuit, and imaging signal processing method of the present disclosure as a whole In the imaging apparatus, imaging signal processing circuit, and imaging signal processing method of the present disclosure, it is possible to set a configuration where it is possible to switch the settings of exposure conditions in imaging frame units for an imaging device.

In the imaging apparatus, the imaging signal processing circuit, and the imaging signal processing method of the present disclosure which include the preferable configuration described above, it is possible to set a configuration formed of an odd numbered line pixel group and an even numbered line pixel group for the arbitrary pixel groups inside the imaging area section. At this time, it is possible to set a configuration where it is possible to alternately switch the setting of exposure conditions with respect to the odd numbered line pixel group and the setting of exposure conditions with respect to the even numbered line pixel group in imaging frame units for the imaging device.

Alternatively, in the imaging apparatus, the imaging signal processing circuit, and the imaging signal processing method of the present disclosure which include the preferable configuration described above, it is possible to set a configuration formed of a first pixel group and a second pixel group where different exposure conditions are set and where the first pixel group and the second pixel group are arranged in a checkered pattern shape for an arbitrary pixel group inside an imaging area section. At this time, for the imaging device, it is possible to set a configuration where it is possible to alternately switch the setting of exposure conditions with respect to the first pixel group and the setting of exposure conditions with respect to the second pixel group in imaging frame units. Description relating to the display apparatus, image signal processing circuit, and image signal processing method of the present disclosure as a whole For a driving section in the display apparatus, the image signal processing circuit, and the image signal processing method of the present disclosure, it is possible to set a configuration which controls a light emitting brightness per unit of time of a light emitting element for each sub-frame according to video signals of a plurality of sub-frames.

In the display apparatus, the image signal processing circuit, and the image signal processing method of the present disclosure which include the preferable configuration described above, arbitrary pixel groups inside an imaging area section are formed of an odd numbered line pixel group and an even numbered line pixel group. At this time, for a sub-frame signal generating section, it is possible to set a configuration which generates video signals of a plurality of sub-frames based on an imaging signal which is obtained from an odd numbered line pixel group and an imaging signal which is obtained from an even numbered line pixel group. In addition, for the driving section, it is possible to set a configuration which performs scanning in two line units, or so-called two line simultaneous scanning driving, with respect to a display panel based on video signals of a plurality of sub-frames.

For the driving section in the display apparatus, the image signal processing circuit, and the image signal processing method of the present disclosure which include the preferable configuration described above, it is possible to set a configuration which controls a writing start position of a display image in sub-frame units based on reading out information of odd numbered lines and even numbered lines.

Alternatively, for a sub-frame signal generating section in the display apparatus, the image signal processing circuit, and the image signal processing method of the present disclosure which include the preferable configuration described above, it is possible to set a configuration which controls a duty of a light emitting element for each sub-frame according to exposure conditions. At this time, it is preferable that the sub-frame signal generating section perform the duty control of the light emitting element using a value which is obtained by multiplying the reciprocal of a ratio of exposure time between images of each of the exposure conditions.

In addition, for the sub-frame signal generating section in the display apparatus, the image signal processing circuit, and the image signal processing method of the present disclosure which include the preferable configuration described above, it is possible to set a configuration which generates a video signal of a sub-frame which is separated into a low brightness gradation information component and a high brightness gradation information component.

Alternatively, for a sub-frame signal generating section in the display apparatus, the image signal processing circuit, and the image signal processing method of the present disclosure which include the preferable configuration described above, it is possible to set a configuration which generates a video signal of a sub-frame using a maximum gradation value which is able to be acquired by an imaging device in addition to exposure conditions. At this time, it is preferable that the sub-frame signal generating section mix the low brightness gradation information component and the high brightness gradation information component in one sub-frame.

In addition, for a sub-frame signal generating section in the display apparatus, the image signal processing circuit, and the image signal processing method of the present disclosure which include the preferable configuration described above, it is possible to set a configuration which generates a video signal of a sub-frame based on an imaging signal which is output from an imaging device by the setting of exposure conditions with respect to an odd numbered line pixel group and the setting of exposure conditions with respect to an even numbered line pixel group being alternately switched in imaging frame units.

Display Apparatus of the Present Disclosure

Before description is given of the imaging apparatus, the imaging signal processing circuit (the imaging signal processing method), and the image signal processing circuit (the image signal processing method) of the present disclosure, description will be given of a display section (a display apparatus) in which the technique of the present disclosure is applied. The display apparatus of the present disclosure is configured by a display section (a display panel/display apparatus) which is described below and the image signal processing circuit of the present disclosure which will be described below.

System Configuration

FIG. 1 is a system configuration diagram which shows a schematic of a basic configuration of a display apparatus, for example, an active matrix type display apparatus, in which the technique of the present disclosure is applied.

An active matrix type display apparatus is a display apparatus which controls current which flows in an electro-optical element (a light emitting element) using an active element which is provided in the same pixel as the electro-optical element, for example, an insulation gate type field effect transistor. Typically, it is possible to use a Thin Film Transistor (TFT) as the insulation gate type field effect transistor.

Here, description will be given using a case of an active matrix type organic EL display apparatus which uses an organic EL element as a light emitting element of a pixel (a pixel circuit) as an example. An organic EL element is an example of a current driving type electro-optical element where the light emitting brightness changes according to the current value which flows in the device. Below, the "pixel circuit" may be simply referred to as a "pixel".

As shown in FIG. 1, an organic EL display apparatus 1 in which the technique of the present disclosure is applied has a configuration which has a pixel array section 30 formed by a plurality of pixels 20, which include an organic EL element, being two-dimensionally arranged in lines (a matrix form) and a driving circuit section (a driving section) which is arranged in the vicinity of the pixel array section 30. The driving circuit section is, for example, formed of a writing scanning section 41, a driving scanning section 42, a signal output section 43, and the like which are mounted on the same display panel 10 as the pixel array section 30 and drives each of the pixels 20 of the pixel array section 30. Here, it is possible to adopt a configuration where some or all of the writing scanning section 41, the driving scanning section 42, and the signal output section 43 are provided outside the display panel 10.

Here, in a case where the organic EL display apparatus 1 corresponds to a color display, one pixel (unit pixel/pixel) which is a unit which forms a color image is configured by a plurality of sub pixels. At this time, each of the sub pixels is equivalent to the pixel 20 in FIG. 1. In more detail, in a display apparatus which corresponds to a color display, one pixel is configured, for example, by three sub pixels of a sub pixel which emits a red (red: R) light, a sub pixel which emits a green (green: G) light, and a sub pixel which emits a blue (blue: B) light.

However, one pixel is not limited to a combination of sub pixels with three RGB primary colors and it is possible to configure one pixel by adding a sub pixel with another color or a plurality of colors in addition to the sub pixels of the three primary colors. In more detail, for example, it is also possible to configure one pixel by adding a sub pixel which emits white (white: W) light in order to improve the brightness or to configure one pixel by adding at least one sub pixel which emits a complementary color light to expand the color reproduction range.

In the pixel array section 30, scanning lines 31 ($31_1$ to $31_m$) and power supply lines 32 ($32_1$ to $32_m$) are wired for each pixel line along a line direction (an array direction/the horizontal direction of the pixels of the pixel lines) with respect to an array of the pixels 20 with m lines and n rows. Furthermore, signal lines 33 ($33_1$ to $33_n$) are wired for each pixel row along a row direction (the array direction/the vertical direction of the pixels of the pixel rows) with respect to an array of the pixels 20 with m lines and n rows.

The scanning lines $31_1$ to $31_m$ are respectively connected with the output ends of the corresponding lines of the writing scanning section 41. The power supply lines $32_1$ to $32_m$ are respectively connected with the output ends of the corresponding lines of the driving scanning section 42. The signal lines $33_1$ to $33_n$ are respectively connected with the output ends of the corresponding rows of the signal output section 43.

The writing scanning section 41 is configured by a shift register circuit or the like. The writing scanning section 41 scans each of the pixels 20 of the pixel array section 30 in order in line units, so-called line sequential scanning, by sequentially supplying writing scanning signals WS ($WS_1$ to $WS_m$) with respect to the scanning lines 31 ($31_1$ to $31_m$) at the time of writing a signal voltage of a video signal in each of the pixels 20 of the pixel array section 30.

The driving scanning section 42 is configured by a shift register circuit or the like in the same manner as the writing scanning section 41. The driving scanning section 42 is synchronized with the line sequential scanning by the writing scanning section 41 and supplies power potentials DS ($DS_1$ to $DS_m$), which are able to be switched between a first power potential $V_{cc\_H}$ and a second power potential $V_{cc\_L}$ which is lower than the first power potential $V_{cc\_H}$, to the power supply lines 32 ($32_1$ to $32_m$). As described below, light emitting/non light emitting (quenching) of the pixel 20 is controlled according to the switching between the power potentials DS $V_{cc\_H}/V_{cc\_L}$ by the driving scanning section 42.

The signal output section 43 selectively outputs a signal voltage (may be simply referred below to as a "signal voltage") $V_{sig}$ of a video signal according to the brightness information which is supplied from a signal supply source (which is not shown in the diagram) and a reference voltage $V_{ofs}$. Here, the reference voltage $V_{ofs}$ is a voltage which is a reference of a signal voltage $V_{sig}$ of a video signal (for example, a voltage which is equivalent to a black level of a video signal) and is used at the time of a threshold correction process which will be described below.

The signal voltage $V_{sig}$/the reference voltage $V_{ofs}$ which are output from the signal output section 43 are written in units of pixel lines which are selected by scanning by the writing scanning section 41 with respect to each of the pixels 20 of the pixel array section 30 via the signal lines 33 ($33_1$ to $33_n$). That is, the signal output section 43 adopts a driving form of line sequential writing which writes a signal voltage $V_{sig}$ in line units.

Pixel Circuit

Figure 2:
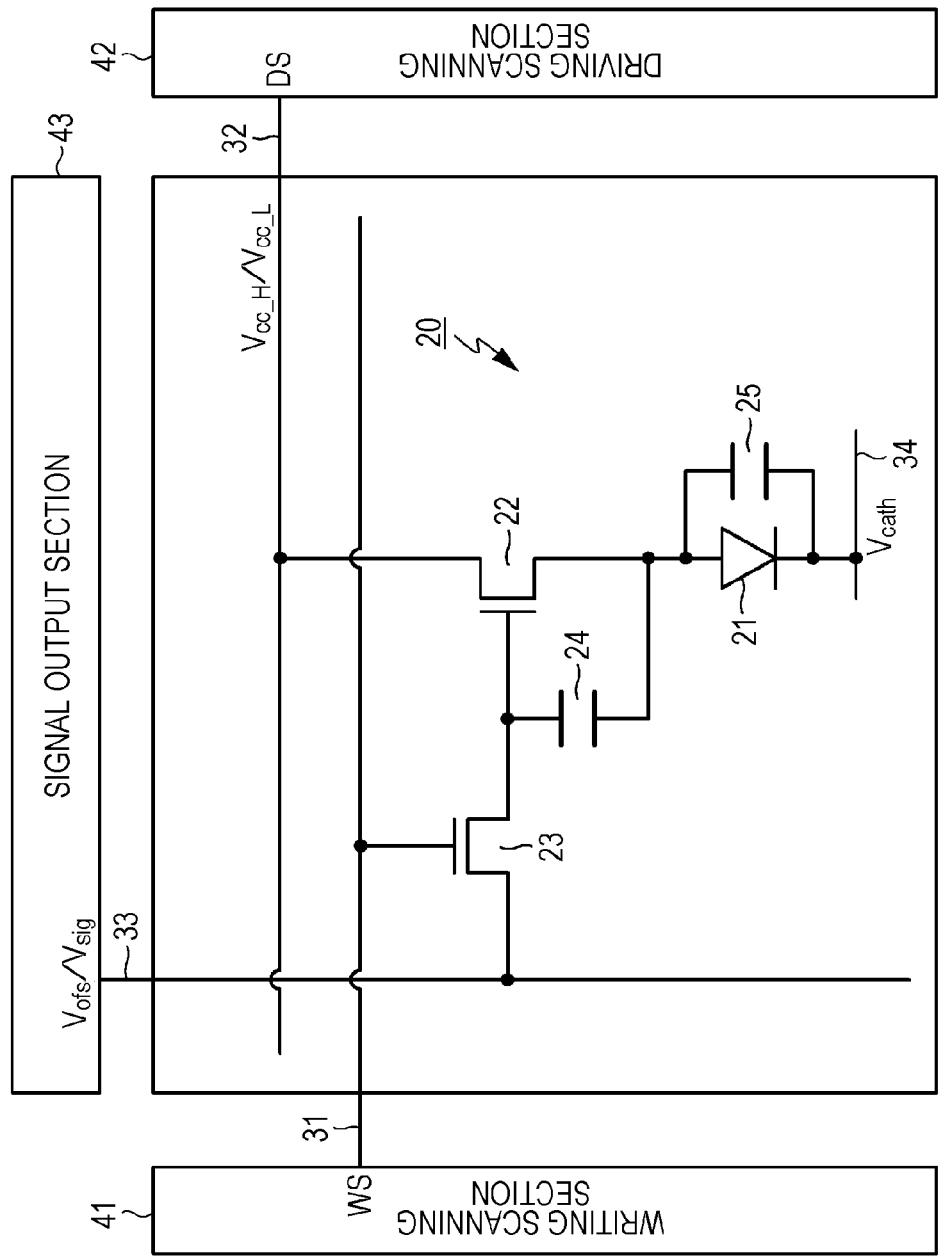
FIG. 2 is a circuit diagram which shows an example of a specific circuit configuration of a pixel (a pixel circuit).

FIG. 2 is a circuit diagram which shows an example of a specific circuit configuration of a pixel (a pixel circuit) 20. A light emitting section of the pixel 20 is formed of an organic EL element 21 which is a current driving type electro-optical element where the light emitting brightness changes according to the current value which flows in the device.

As shown in FIG. 2, the pixel 20 is configured by the organic EL element 21 and a driving circuit which drives the organic EL element 21 by passing current through the organic EL element 21. In the organic EL element 21, a cathode electrode is connected with a common power line 34 which is wired in common with respect to all of the pixels 20.

A driving circuit which drives the organic EL element 21 has a configuration which has a driving transistor 22, a sampling transistor 23, a holding capacitor 24, and a supporting capacitor 25. It is possible to use, for example, an N-channel type TFT as the driving transistor 22 and the sampling transistor 23.

However, the conductive type combination of the driving transistor 22 and the sampling transistor 23 shown here is only an example and the present disclosure is not limited to combinations of these. That is, it is possible to use a P-channel type TFT as one or both of the driving transistor 22 and the sampling transistor 23.

In the driving transistor 22, one electrode (a source/drain electrode) is connected with an anode electrode of the organic EL element 21 and the other electrode (a source/drain electrode) is connected with the power supply lines 32 ($32_1$ to $32_m$).

In the sampling transistor 23, one electrode (a source/drain electrode) is connected with the signal lines 33 ($33_1$ to $33_n$) and the other electrode (a source/drain electrode) is connected with a gate electrode of the driving transistor 22. In addition, the gate electrode of the sampling transistor 23 is connected with the scanning lines 31 ($31_1$ to $31_m$).

In the driving transistor 22 and the sampling transistor 23, one electrode refers to metal wiring which is electrically connected with one source/drain region and the other electrode refers to metal wiring which is electrically connected with the other source/drain region. In addition, according to the potential relationship between one electrode and the other electrode, one electrode may be a source electrode or may be a drain electrode and the other electrode may be a drain electrode or may be a source electrode.

In the holding capacitor 24, one electrode is connected with a gate electrode of the driving transistor 22 and the other electrode is connected with the other electrode of the driving transistor 22 and an anode electrode of the organic EL element 21.

In the supporting capacitor 25, one electrode is connected with an anode electrode of the organic EL element 21 and the other electrode is connected with a node of a fixed potential (in this example, a cathode electrode of the common power line 34/the organic EL element 21). The supporting capacitor 25 is provided, for example, in order to supplement the capacitance deficit of the organic EL element 21 and increase the writing gain of a video signal with respect to the holding capacitor 24. However, the supporting capacitor 25 is not a necessary constituent element. That is, the supporting capacitor 25 is unnecessary in a case where it is not necessary to supplement the capacitance deficit of the organic EL element 21.

In the pixel 20 with the configuration described above, the sampling transistor 23 is in a conductive state corresponding to the writing scanning signals WS which are applied to a gate electrode through the scanning lines 31 from the writing scanning section 41 and where a high voltage state is an active state. Due to this, the sampling transistor 23 samples a signal voltage $V_{sig}$ of a video signal according to the brightness information or a reference voltage $V_{ofs}$ which are supplied from the signal output section 43 through the signal lines 33 at a different timing and writes these in the pixel 20. The signal voltage $V_{sig}$ or the reference voltage $V_{ofs}$ which is written by the sampling transistor 23 is applied to a gate electrode of the driving transistor 22 and held in the holding capacitor 24.

The driving transistor 22 operates in a saturation region by one electrode being a drain electrode and the other electrode being a source electrode when the power potentials DS of the power supply lines 32 ($32_1$ to $32_m$) are in the first power potential $V_{cc\_H}$. Due to this, the driving transistor 22 carries out light emitting driving of the organic EL element 21 by driving a current after receiving a supply of current from the power supply line 32. In more detail, the driving transistor 22 supplies a driving current with a current value according to a voltage value of the signal voltage $V_{sig}$ which is held in the holding capacitor 24 to the organic EL element 21 by operating in the saturation region and the driving current makes the organic EL element 21 emit light.

The driving transistor 22 further operates as a switching transistor by one electrode being a source electrode and the other being a drain electrode when the power potential DS is switched from the first power potential $V_{cc\_H}$ to the second power potential $V_{cc\_L}$. Due to this, the driving transistor 22 stops supplying a driving current to the organic EL element 21 and sets the organic EL element 21 to a non-light emitting state. That is, the driving transistor 22 also has a function as a transistor which controls light emitting/non-light emitting of the organic EL element 21 in addition to the switching of the power potentials DS ($V_{cc\_H}$/$V_{cc\_L}$).

The organic EL element 21 is provided with a period in a non-light emitting state (a non-light emitting period) due to the switching operation of the driving transistor 22 and it is possible to control the ratio (duty) of the light emitting period and the non-light emitting period of the organic EL element 21. Due to the duty control, since it is possible to reduce afterimage blur which accompanies a pixel emitting light over one display frame period, in particular, it is possible to make the image quality of a film better.

The first power potential $V_{cc\_H}$ out of the first and second power potentials $V_{cc\_H}$ and $V_{cc\_L}$ which are selectively supplied through the power supply line 32 from the driving scanning section 42 is a power potential for supplying a driving current, which drives the light emitting of the organic EL element 21, to the driving transistor 22. In addition, the second power potential $V_{cc\_L}$ is a power potential for applying a reverse bias with respect to the organic EL element 21. The second power potential $V_{cc\_L}$ is set as a potential which is lower than a reference voltage $V_{ofs}$, for example, when a threshold voltage of the driving transistor 22 is set to $V_{th}$, a potential which is lower than $V_{ofs}$-$V_{th}$, preferably a potential which is sufficiently lower than $V_{ofs}$-$V_{th}$.

In the organic EL display apparatus 1 described above, each of the pixels 20 of the pixel array section 30 has a function which corrects variations in the driving current which are caused by variations in the characteristics of the driving transistor 22. Here, examples of characteristics of the driving transistor 22 include a threshold voltage $V_{th}$ of the driving transistor 22 or a degree of movement u of a semiconductor thin film which configures a channel of the driving transistor 22 (referred to below simply as a "degree of movement u of the driving transistor 22").

Correction of variations in the driving current which are caused by variations in a threshold voltage $V_{th}$ of the driving transistor 22 (referred to below as "threshold correction") is performed by initializing a gate voltage $V_g$ of the driving transistor 22 to a reference voltage $V_{ofs}$. In detail, a threshold correction process is a process which changes a source voltage $V_s$ of the driving transistor 22 toward a potential where the threshold voltage $V_{th}$ of the driving transistor 22 is subtracted from an initialization voltage by setting the initialization voltage (the reference voltage $V_{ofs}$) of the gate voltage $V_g$ of the driving transistor 22 as a reference.

On the other hand, correction of variations in a driving current which are caused by variations in the degree of movement u of the driving transistor 22 (referred to below as "degree of movement correction") is performed by passing a current via the driving transistor 22 through the holding capacitor 24 in a state where the sampling transistor 23 is in a conductive state and writing a signal voltage $V_{sig}$ of a video signal. In other words, a degree of movement correction process is a process which applies negative feedback to the holding capacitor 24 with a feedback amount (correction amount) according to a current $I_{ds}$ which flows in the driving transistor 22. Due to the threshold correction process described above, dependency with respect to a threshold voltage $V_{th}$ of a current $I_{ds}$ between a drain and a source is already canceled when a signal voltage $V_{sig}$ of a video signal is written and the current $I_{ds}$ between a drain and a source depends on the degree of movement u of the driving transistor 22.

Accordingly, it is possible to suppress dependency with respect to the degree of movement u of the current $I_{ds}$ which flows between a drain and a source in the driving transistor 22 by executing a degree of movement correction process which applies negative feedback to the voltage $V_{ds}$ between a drain and a source of the driving transistor 22 with a feedback amount according to the current $I_{ds}$ which flows between a drain and a source in the driving transistor 22. That is, by executing a correction process such as threshold correction, degree of movement correction, or the like, it is possible to maintain a constant light emitting brightness of the organic EL element 21 while suppressing the influence of changes over time or the like in the transistor characteristics (a threshold voltage $V_{th}$ or the degree of movement u) of the driving transistor 22. As a result, it is possible to obtain a display image with a favorable image quality.

The organic EL display apparatus described above (the display apparatus of the present disclosure) 1 in which the technique of the present disclosure is applied has the image signal processing apparatus of the present disclosure which will be described below (or uses the image signal processing method of the present disclosure). Then, a video signal which is processed with the image signal processing apparatus (the image signal processing method) of the present disclosure is supplied to the signal output section 43 on the display panel 10 described above and used for driving each of the pixels 20 of the pixel array section 30. Below, description will be given of embodiments of the image signal processing apparatus (the image signal processing method) of the present disclosure.

Descriptions of Embodiments

In the present embodiment, driving for carrying out display in sub-frame units with respect to a display section, or so-called sub-frame display, is performed based on a high dynamic range (HDR) signal where a plurality of image information groups of different exposure conditions (photographic exposure conditions) are acquired in a batch in an imaging section. In general, since it is possible to control a range of subject reflectivity which is able to be captured by changing the exposure conditions, it is possible to effectively utilize a high dynamic range (HDR) of an imaging device.

Generally, in a digital camera which is defined as high dynamic range (HDR), a process of synthesizing image information for expanding the high dynamic range (increasing the dynamic range) is performed under the control of a built in processor after acquiring the image information groups as described above. Then, a conversion process is performed to obtain information of one HDR image where a compression process is carried out in a predetermined gradation reproduction range. In contrast to this, the image information which is used in the present embodiment is an image information group before HDR signal synthesis.

In the present embodiment, in an imaging device where it is possible to individually set two or more types of exposure conditions with respect to an arbitrary pixel groups inside an imaging area section, an imaging signal which is obtained from pixel groups where the exposure conditions are individually set is read out in units of one imaging frame. Then, signal separation is performed for each exposure condition and association with the exposure conditions is performed with respect to the imaging signal which is read out in units of one imaging frame from the imaging device.

On the other hand, on the display section side, the imaging signal which is output by signal separation being carried out for each exposure condition in the imaging section side and association with the exposure conditions being carried out is input in units of one imaging frame as the imaging signal of a processing target. Then, a video signal of sub-frames is generated by controlling the light emitting time of the light emitting element for each sub-frame according to the associated exposure conditions. At this time, the light emitting brightness per unit of time of the light emitting element is preferably controlled for each sub-frame according to the plurality of items of image information.

The present embodiment adopts a method which performs sub-frame display, which displays a plurality of images in sub-frame units as they are, without performing a synthesizing process on the image information. Then, since a plurality of items of the input image information are optically added in the sub-frame display, it is possible to reproduce gradation information during capturing without waste. In addition, since the exposure conditions of the subject are reflected in the display conditions by controlling the light emitting conditions of the light emitting element, that is, the light emitting time, for sub-frame according to the exposure conditions, it is possible for the screen display brightness to correctly represent the subject reflectivity of a captured image at the time of representing the sub-frames.

Imaging Apparatus of the Present Disclosure

Figure 3:
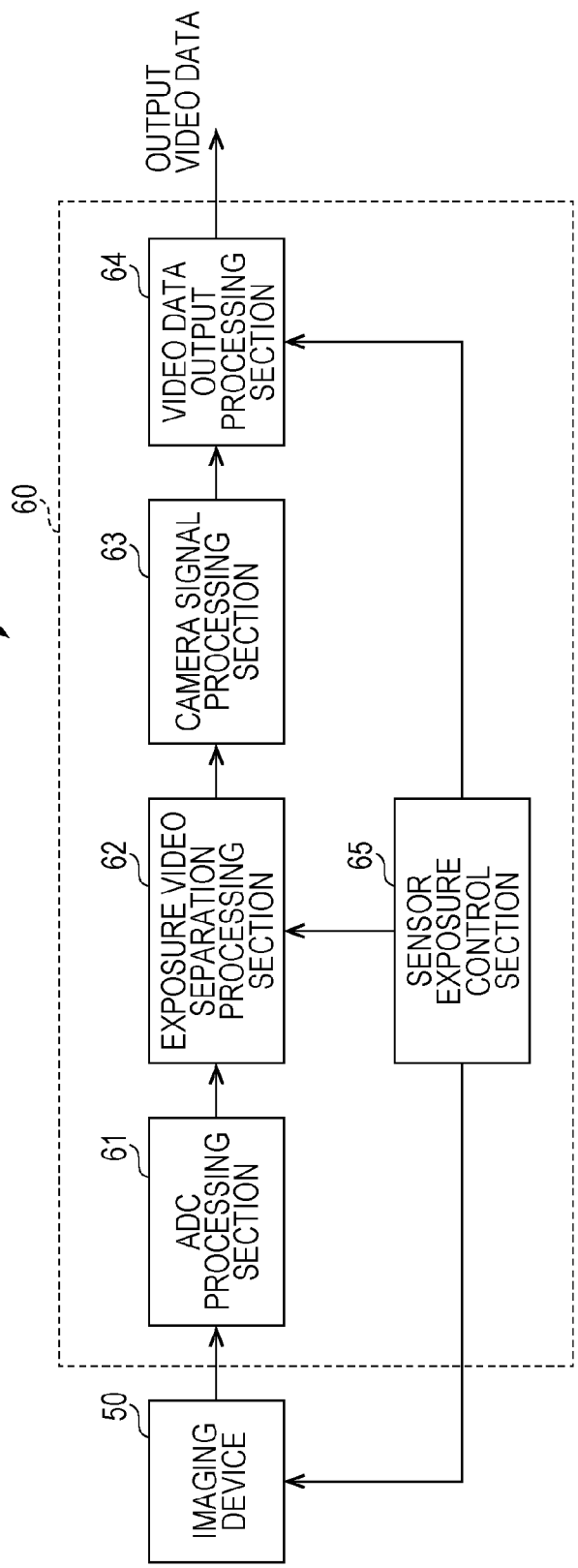
FIG. 3 is a block diagram which shows an example of a configuration of an imaging apparatus of the present disclosure.

FIG. 3 shows an example of a configuration of an imaging apparatus (an imaging section) of the present disclosure. An imaging section (imaging apparatus) 2 has a configuration formed of an imaging device 50 and an imaging signal processing section 60. The imaging device 50 is, for example, formed of a solid-state imaging element such as a CCD type imaging element or CMOS type imaging element and has an imaging area section (pixel array section) 52 which is formed by pixels (sub pixels) 51 which include light receiving elements (for example, photosensors) being two-dimensionally arranged in lines as shown in FIG. 4A.

Also in the imaging device 50, in the same manner as the organic EL display apparatus 1, in a case of corresponding to colors, one pixel 51 which is a unit which forms a color image is configured by a plurality of sub pixels. In detail, one pixel 51 is, for example, configured by four sub pixels which include R (red), G (green), and B (blue) which are arranged adjacent to each other on the left, right, top and bottom. The present example is a pixel arrangement with a checkered pattern shape which is formed by two sub pixels of G being arranged in a diagonal line and a sub pixel of R and a sub pixel of B being arranged in a diagonal line.

In a pixel arrangement with a checkered pattern shape, two lines adjacent to each other in an array of sub pixels are one line of an array of one pixel 51 which is a unit which forms a color image (may be referred to below as a "line"). With respect to the imaging device 50 with the pixel arrangement with a checkered pattern shape, the present embodiment adopts a configuration where it is possible to set individual exposure conditions for odd numbered lines and even numbered lines. It is possible to realize the setting of individual exposure conditions by controlling the photographic exposure time or the like with respect to the light receiving element inside the pixel (sub pixels) 51 in the imaging area section 52. The light receiving area of the pixel 51 which influences the sensitivity is common to all of the pixels 51.

Figure 4A:
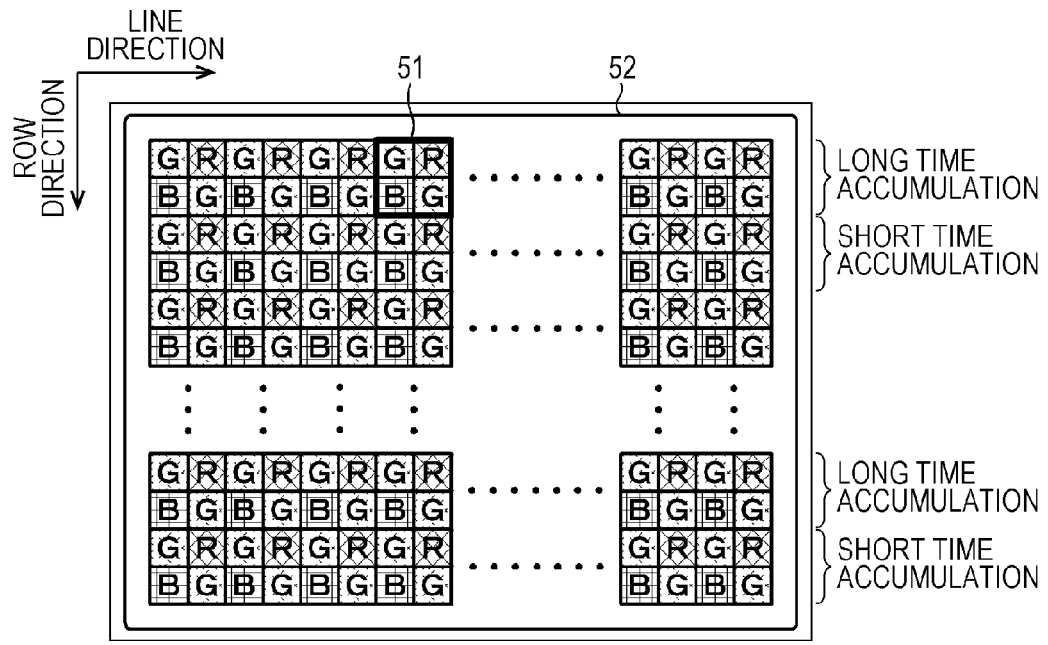
FIG. 4A is a diagram which shows a pixel arrangement with a checkered pattern shape in an imaging device and FIG. 4B is a block diagram which shows an example of a configuration of a camera signal processing section in an imaging signal processing section.

In the present embodiment, in the pixel arrangement shown in FIG. 4A, in a case of setting 1 line, 2 line, 3 line, and so on from the top of the diagram, for example, a long time accumulation exposure condition (photographic exposure for a long time) which accumulates a photoelectrically converted signal electrical charge for a relatively long time is applied to the odd numbered lines. In addition, a short time accumulation exposure condition (photographic exposure for a short time) which accumulates a photoelectrically converted signal electrical charge for a relatively short time is applied to the even numbered lines. Then, at the same timing, pixel information with different exposure conditions is read out in a batch in units of one imaging frame.

An analog imaging signal which is output from the imaging device 50 is supplied to the imaging signal processing section 60. As shown in FIG. 3, the imaging signal processing section 60 has a configuration formed of an analog/digital conversion (ADC) processing section 61, an exposure video separation processing section 62, a camera signal processing section 63, a video data output processing section 64, and a sensor exposure control section 65.

In the imaging signal processing section 60, the analog imaging signal which is input is supplied to the exposure video separation processing section 62 after being converted to digital data in the ADC processing section 61. The exposure video separation processing section 62 separates the input data into pixel information units for each exposure condition. In the present embodiment, the input data is separated into pixel information of odd numbered lines (sub-frame 1) where exposure conditions of long time accumulation are applied and pixel information of even numbered lines (sub-frame 2) where exposure conditions of short time accumulation are applied. Detailed description will be given of a process in the camera signal processing section 63. The video data output processing section 64 adds exposure setting pixel information and information such as the exposure conditions with respect to pixel information for each exposure condition which is separated in the exposure video separation processing section 62 and outputs the result as output video data along with each of the exposure condition images.

Here, the exposure setting pixel information is, for example, information in which a pixel region and exposure conditions are associated. The exposure setting pixel information in the present embodiment is information for reflecting setting exposure conditions of long time accumulation in odd numbered lines and setting exposure conditions of short time accumulation in even numbered lines in subsequent signal processing. That is, the odd numbered lines and the even numbered lines are a pixel region. Control of exposure conditions for each pixel region or management of exposure setting pixel information is executed in the sensor exposure control section 65.

Figure 4B:
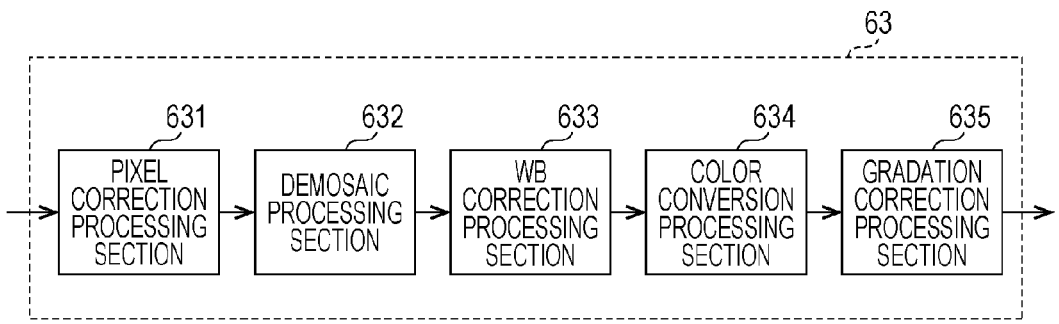

FIG. 4B shows an example of a configuration of the camera signal processing section 63 in the imaging signal processing section 60. The camera signal processing section 63 according to the present example has a configuration formed of a pixel correction processing section 631, a demosaic processing section 632, a white balance (WB) correction processing section 633, a color conversion processing section 634, and a gradation correction processing section 635.

In the camera signal processing section 63 with the configuration described above, the pixel correction processing section 631 performs a process of correcting pixel defects or sensitivity variation for the imaging device 50 with respect to pixel information for each exposure condition which is separated in the exposure video separation processing section 62. The demosaic processing section 632 performs a demosaic process which calculates an RGB value based on a pixel arrangement pattern such as a checkered pattern. The WB correction processing section 633 performs a white balance adjustment process which finds the balance of the RGB value with respect to white. With respect to a signal after the white balance adjustment, a color conversion process is performed in the color conversion processing section 634 and a gradation correction process is performed in the gradation correction processing section 635.

Figure 5A:
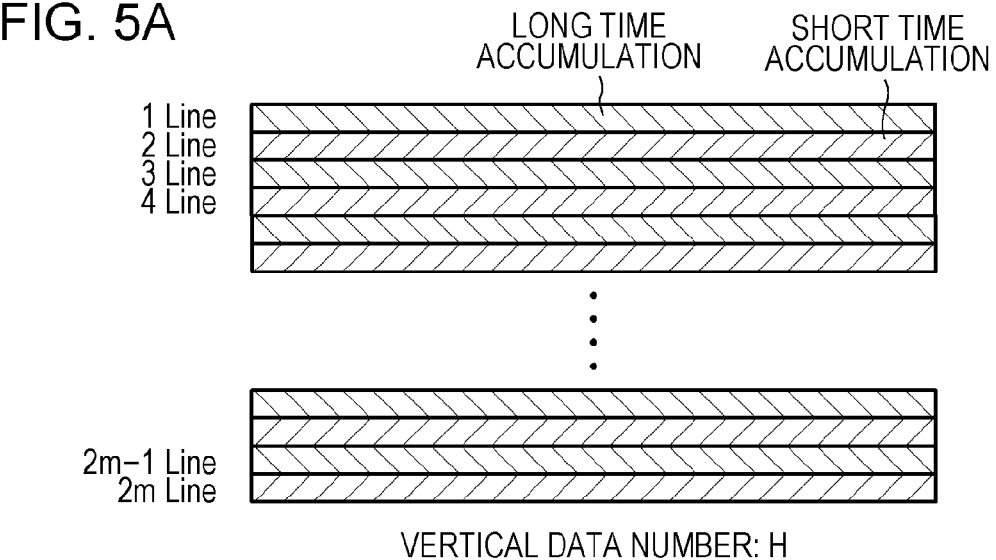
FIG. 5A is a diagram which shows pixel information which is read out in a batch from the imaging device in units of one imaging frame.
Figure 5B:
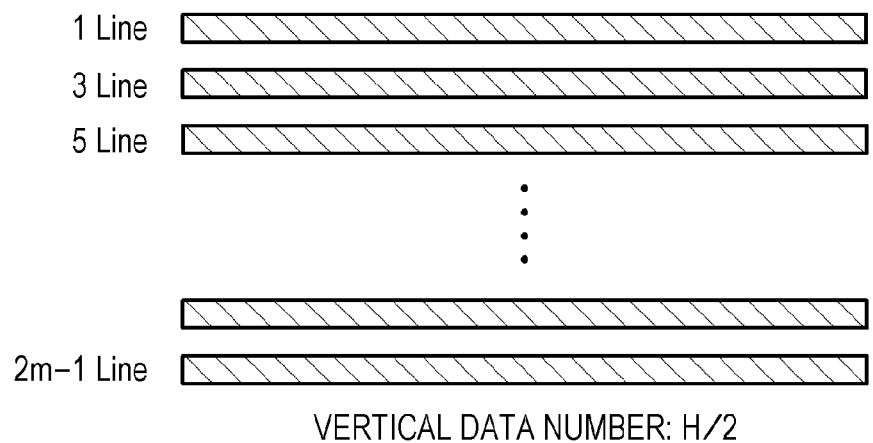
FIG. 5B is a diagram which shows pixel information of a sub-frame 1 where an exposure condition of long time accumulation is applied.
Figure 5C:
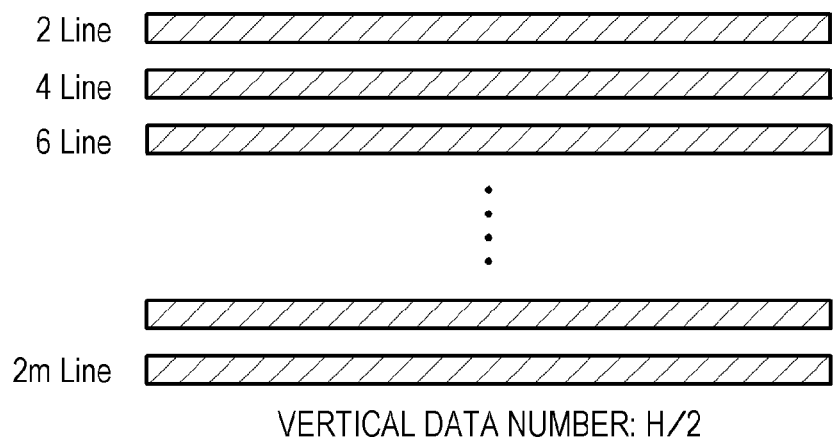
FIG. 5C is a diagram which shows pixel information of a sub-frame 2 where an exposure condition of short time accumulation is applied.

FIG. 5A is a diagram which shows pixel information which is read out in a batch from the imaging device 50 in units of one imaging frame. FIG. 5B shows pixel information of the sub-frame 1 where an exposure condition of long time accumulation is applied and FIG. 5C shows pixel information of the sub-frame 2 where an exposure condition of short time accumulation is applied. When vertical resolution of the imaging device 50 is set to 2m lines (m is a natural number), pixel information for each exposure condition is data of vertical resolution of m lines. In addition, when a vertical data number of pixel information of one imaging frame is set as H, the vertical data number of each pixel information of sub-frames 1 and 2 is H/2.

As described above, video data where individual exposure conditions and image information are packed, that is, video data of a high dynamic range (HDR) where a plurality of images with different exposure conditions are acquired in a batch is output from the imaging section (imaging apparatus) 2. The video data is supplied to the image signal processing circuit of the present disclosure and a signal process for performing sub-frame display is performed. Below, description will be given of detailed embodiments of the image signal processing circuit of the present disclosure.

Embodiment 1

Figure 6:
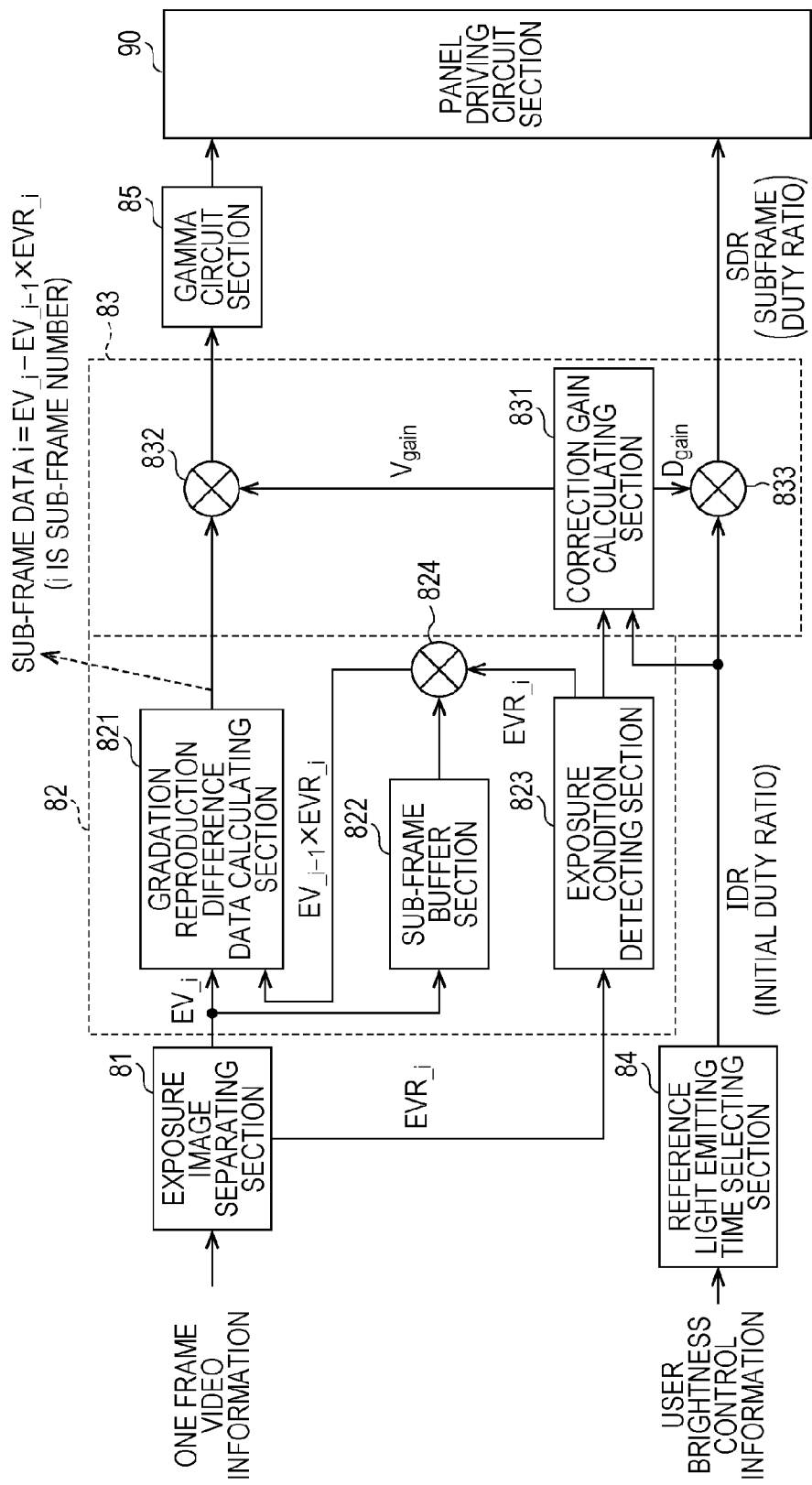
FIG. 6 is a block diagram which shows a configuration of an image signal processing circuit according to embodiment 1.

FIG. 6 is a block diagram which shows a configuration of an image signal processing circuit according to embodiment 1. As shown in FIG. 6, an image signal processing circuit 80 according to embodiment 1 has a configuration which has an exposure image separation section 81, a sub-frame signal generating section 82, a sub-frame correction section 83, a reference light emitting time selection section 84, and a gamma circuit section 85. The image signal processing circuit 80 inputs one frame video information and user brightness control information.

As described above, the one frame video information is video information where individual exposure conditions and image information are packed, that is, video information of a high dynamic range (HDR) where a plurality of images with different exposure conditions are acquired in a batch. User brightness control information is control information for a user to arbitrarily set screen display brightness and is input in the reference light emitting time selection section 84. The reference light emitting time selection section 84 receives the user brightness control information, and selects and sets an initial light emitting time IDR (Initial Duty Ratio) as a light emitting time which is a reference for a light emitting element.

In the image signal processing circuit 80 with the configuration described above, when video information where individual exposure conditions and image information are packed is input, the exposure image separation section 81 separates the video information into images captured with the individual exposure conditions (referred below to as "exposure images"). In more detail, the exposure image separation section 81 separates video information into which individual exposure conditions and image information are packed, for example, two exposure images which are captured with two exposure conditions, that is, pixel information EV1 of an odd numbered line and pixel information EV2 of an even numbered line.

The exposure image separation section 81 further calculates an exposure ratio EVR. Here, the exposure ratio EVR is a ratio of the exposure time (shutter speed) between exposure images. In a case where the exposure time of the odd numbered line is TEV1, the exposure time of the even numbered line is TEV2, and the exposure ratio EVR1 of the pixel information EV1 of the odd numbered line is a reference, it is possible to calculate the exposure ratios EVR1 and EVR2 of each of the lines based on the following formulas.

$$EVR1=1$$

$$EVR2=TEV2/TEV1$$

The exposure time is an example of the exposure conditions (exposure information/exposure related information) which is recorded in a tag inside image data or the like. The exposure conditions are not limited to exposure time and, for example, it is possible to use individual gain information of sensors. The "sensor" referred to here has the meaning of a light receiving element (photosensor) of the imaging device and the "gain" has the meaning of the gain of an amplifier section which amplifies the output of the light receiving element. It is possible to directly use the exposure related information which is recorded in a tag inside the image data or the like and it is also possible to use a result where a translation process is carried out with a particular conversion table or the like based on the tag information.

The exposure images EV (EV1 and EV2) which are separated in the exposure image separation section 81 and the exposure ratio EVR (EVR1 and EVR2) which is calculated in the exposure image separation section 81 are supplied to the sub-frame signal generating section 82. The sub-frame signal generating section 82 generates a video signal of a sub-frame (may be referred to below as a "sub-frame signal") for realizing a suitable dynamic range based on the exposure images EV and the exposure ratio EVR.

Figure 7A:
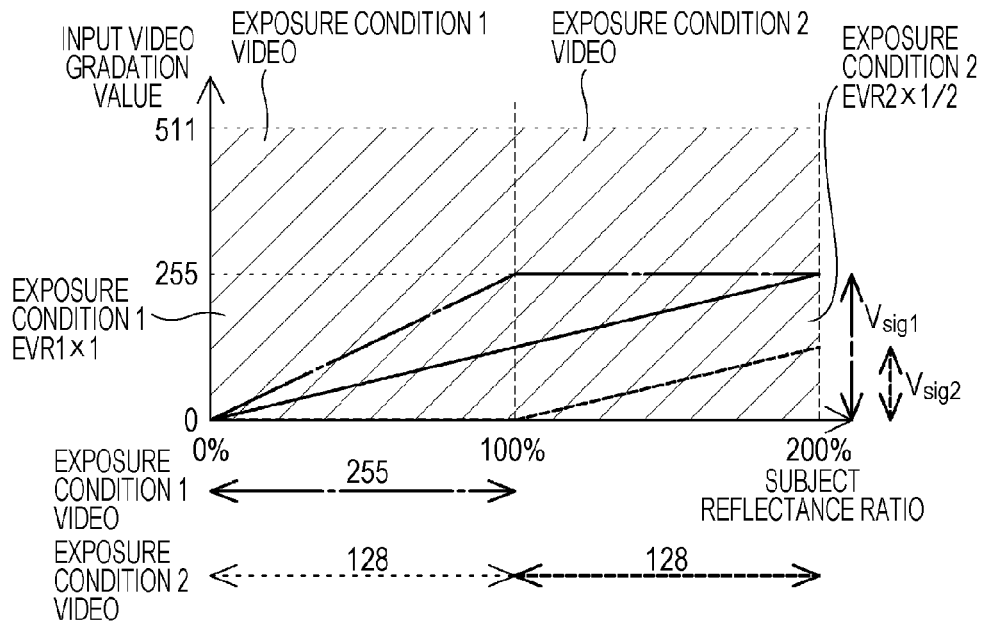
FIGS. 7A and 7B are diagrams which illustrate a summary of a data generation example of a sub-frame signal of embodiment 1.
Figure 7B:
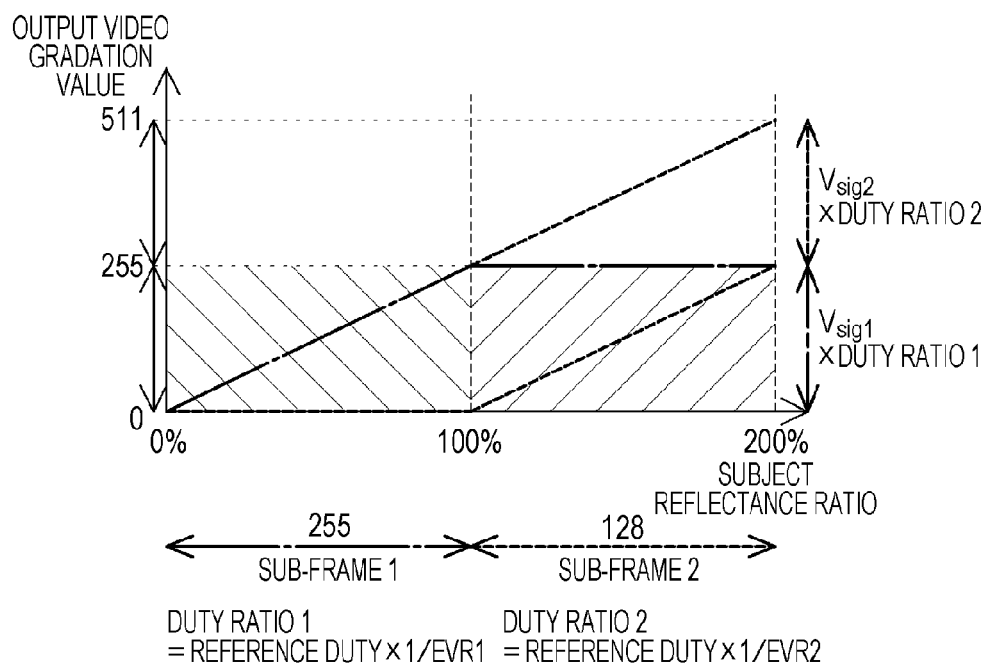

Here, based on FIGS. 7A and 7B, description will be given of a summary of a data generation example of a sub-frame signal when two types of the exposure images EV1 and EV2 and the exposure ratios EVR1 and EVR2 which are calculated with the image information EV1 as a reference are input in the sub-frame signal generating section 82. The data generation example described here is a case where the exposure ratio EVR is double (×2). FIG. 7A shows characteristics of a subject reflectivity-input video gradation value and FIG. 7B shows characteristics of a subject reflectivity-output video gradation value.

The exposure image EV1 has a signal value which is saturated when a subject reflectivity is 100[%] or more and is able to faithfully reproduce a subject brightness of less than 100[%], and is a so-called relatively bright image. Accordingly, a process is performed which assigns the exposure image EV1 as it is on the sub-frame 1 which displays information with a subject reflectivity of less than 100[%]. The exposure image EV2 has a signal value which is able to reproduce up to a subject reflectivity of 200[%] without being saturated, and is a so-called relatively dark image. Accordingly, control is performed so as to select and assign the exposure image EV2 in order to display information with a subject reflectivity of 100[%] or more and less than 200[%] in the sub-frame 2.

However, since information with a subject reflectivity of less than 100[%] is also included in the exposure image EV2, information with a subject reflectivity of less than 100[%] is unnecessarily added in a case of using as display data as it is. Accordingly, in order to assign information as data of a sub-frame signal (may also be referred to below as "sub-frame data"), a process which subtracts information with a subject reflectivity of 100[%] and only extracts information of 100[%] or more is performed. In detail, it is possible to determine the sub-frame data by calculation of the following definition formulas.

$$\text{Sub-frame Data } 1 = EV1$$

$$\text{Sub-frame Data } 2 = EV2 - EVR2 \times EV1$$

Here, there is an advantage that it is possible to reduce a waiting time for calculating the data (the calculation delay time) by processing the exposure ratios EVR in descending order at the time of calculation of the sub-frame data. The relationship between the exposure ratio EVR and the sub-frame data is as follows.

Exposure ratio EVR is large—data where a high brightness component is saturated (LDR)

Exposure ratio EVR is large—data where a high brightness component is not saturated (LDR+HDR)

LDR is a low dynamic range and HDR is a high dynamic range.

As is clear from the above description, in a case where the exposure image EV2 (LDR+HDR) is input first, input of the exposure image EV1 (LDR) is necessary in order to calculate the sub-frame data 2. Accordingly, in a case where data is input in time series, a calculation delay time is generated since it is necessary to wait for the calculation until two data items are calculated. In contrast to this, when input is performed from the exposure image EV1, it is possible to reduce the calculation delay time since it is possible to use data of the exposure image EV1 itself as the sub-frame data and the calculation waiting described above is not necessary.

For example, as shown in FIG. 6, the sub-frame signal generating section 82 has a configuration which has a gradation reproduction difference data calculation section 821, a sub-frame buffer section 822, an exposure condition detecting section 823, and a multiplier 824. An exposure image EV which is separated in the exposure image separation section 81 is input in the gradation reproduction difference data calculation section 821 and the sub-frame buffer section 822. The exposure condition detecting section 823 inputs the exposure ratio EVR which is calculated in the exposure image separation section 81 and outputs a gain which is determined by the exposure ratio EVR.

Here, when the exposure image EV of the i-th (in the present example, i=2) sub-frame is set as $EV_{\_i}$, an exposure image $EV_{\_i-1}$ of the sub-frame which is one sub-frame previous is output from the sub-frame buffer section 822. Then, with respect to the exposure image $EV_{\_i-1}$, a gain $EVR_{\_i}$ for the exposure image $EV_{\_i}$ of the i-th sub-frame which is output from the exposure condition detecting section 823 is multiplied in the multiplier 824. The multiplication result (= $EV_{\_i-1} \times EVR_{\_i}$) of the multiplier 824 is supplied to the gradation reproduction difference data calculation section 821.

In the gradation reproduction difference data calculation section 821, a process which subtracts information with a subject reflectivity of 100[%] and only extracts information of 100[%] or more, that is, a process which calculates sub-frame gradation reproduction difference data is performed. In detail, the gradation reproduction difference data calculation section 821 performs a process which subtracts the multiplication result (= $EV_{\_i-1} \times EVR_{\_i}$) of the multiplier 824 from the exposure image $EV_{\_i}$. Due to the subtraction process, $EV_{\_i} - EV_{\_i-1} \times EVR_{\_i}$ is output as data (referred below to as "sub-frame data i") of a sub-frame i (i is the number of the sub-frame) from the gradation reproduction difference data calculation section 821.

In this manner, regarding a process which obtains the sub-frame data i by the calculation of the definition formulas described above, it is possible to carry out the processing in time series by using the gradation reproduction difference data calculation section 821 which has a subtraction function or the sub-frame buffer section 822 which has a delay function of a time which is equivalent to one sub-frame. Under the premise that the sub-frame buffer section 822 is reset to 0 during the process of generating the first sub-frame data 1, it is possible to represent the definition formulas described above as follows.

Sub-frame data 1=$EV1-EVR1 \times ALL0$

Sub-frame data 2=$EV2-EVR2 \times EV1$

In the image signal processing circuit 80, a process which calculates a correction value (correction gain) of the sub-frame light emitting time is performed in the sub-frame correction section 83 along with the generating of the sub-frame data i in the sub-frame signal generating section 82.

As is clear from FIGS. 7A and 7B, in order to maintain a linear relationship between the subject reflectivity and panel display brightness which are input, it is necessary that the brightness of the sub-frame 1 for display with a subject reflectivity of less than 100[%] and the brightness of the sub-frame 2 for display with a subject reflectivity of 100[%] or more and less than 200[%] be substantially the same value. In a case where light emitting time is set to be the same in the value of a generated sub-frame signal, it is understood that there is a relationship where the brightness of the sub-frame 2≠the brightness of ½ of the sub-frame 1 and that it is not possible to satisfy linearity between the subject reflectivity and the panel display brightness which are input during the sub-frame display operation.

Thus, in the present embodiment, in order to maintain the linearity of the brightness reproduction of the sub-frame display operation, correction of the light emitting time sub-frame duty ratio (SDR) for each sub-frame based on the value of the exposure ratio EVR is performed in the sub-frame correction section 83. The sub-frame correction section 83 has a configuration formed of a correction gain calculation section 831 and multipliers 832 and 833.

In the sub-frame correction section 83, the correction gain calculation section 831 inputs the exposure ratio EVR and calculates a correction gain (correction coefficient) $C_{gain}$ for each sub-frame based on the exposure ratio EVR. In detail, the correction gain calculation section 831 performs a process which calculates the correction gain $C_{gain}$ with a reciprocal of the exposure ratio EVR ($C_{gain}=1/EVR$) and assigns the value to a correction gain $D_{gain}$ of the sub-frame light emitting time SDR.

In a case of the data generation example described above, correction is not carried out in the sub-frame 1 since $C_{gain}=1$. In the sub-frame 2, a correction process which multiplies the sub-frame light emitting time SDR by $C_{gain}$ is carried out since $C_{gain}=1/EVR2$.

Here, when the brightness of the sub-frame 1 is set as L1, the brightness of the sub-frame 2 is set as L2, the duty of the sub-frame 1 is set as Duty 1, and the duty of the sub-frame 2 is set as Duty 2, $L1 \propto$ sub-frame data 1×Duty 1

$L2 \propto$ sub-frame data 2×Duty 1×$C_{gain}$ $\propto$ ½ sub-frame data 1×Duty 1×$C_{gain}=L1$ However, regarding the correction of the sub-frame light emitting time SDR, since the range of the controllable light emitting time has a limit, a correction limit is generated depending on the value of the initial light emitting time IDR which is set in the reference light emitting time selection section 84.

As described above, in the sub-frame correction section 83, light emitting control of the display panel is performed based on the sub-frame data i and the sub-frame light emitting time SDR where correction gains $V_{gain}$ and $D_{gain}$ which are calculated in the correction gain calculation section 831 are added. In detail, correction is performed by the correction gain $V_{gain}$ being multiplied with respect to the sub-frame data i in the multiplier 832. Then, the sub-frame data i after correction is supplied to the panel driving circuit section 90 via the gamma circuit section 85. The panel driving circuit section 90 is a driving section which carries out light emitting driving for light emitting elements of each pixel of the display panel with light emitting brightness (light emitting brightness per unit time) according to the sub-frame data i.

In addition, correction for maintaining the linearity of the brightness reproduction of the sub-frame display operation is performed by the correction gain $D_{gain}$ being multiplied in a multiplier 87 with respect to the initial light emitting time IDR which is set in the reference light emitting time selection section 84. Then, the sub-frame light emitting time SDR after correction is supplied to the panel driving circuit section 90. The panel driving circuit section 90 determines the light emitting time (the sub-frame light emitting time) for each sub-frame based on the sub-frame light emitting time SDR and controls the ratio of the light emitting time and non-light emitting time of the light emitting element, that is, the duty. That is, the duty of the light emitting element is controlled according to the exposure conditions. In the organic EL display apparatus 1 described above for each sub-frame, it is possible to control the duty of the organic EL element 21 according to the switching timing of the $V_{cc\_H}/V_{cc\_L}$ of the power potential DS.

Here, it is known that for the light emitting characteristics of the display panel, the light emitting brightness (the display brightness) generally exhibits non-linear characteristics with respect to the input signal. Therefore, a process which corrects the characteristics (that is, the light emitting characteristics of the display panel) of the light emitting brightness to be linear with respect to the input signal is necessary. The correction process is executed in the gamma circuit section 85.

The gamma circuit section 85 is provided with a gamma correction table for correcting the characteristics of the light emitting brightness to be linear with respect to the input signal. Then, by performing gamma correction based on the gamma correction table in the gamma circuit section 85, the linearity of the light emitting brightness is maintained with respect to an input signal even when sub-frame display is performed.

The brightness in the operation of sub-frame display is defined by the following formula and the total of the brightness Li (i is a number of the sub-frame) of each of the sub-frames is a frame brightness L. Here, when i=2, when the light emitting time of the sub-frame 1 is set as DR1, the light emitting time of the sub-frame 2 is set as DR2, a signal level of the sub-frame 1 is set as $V_{sig1}$, and a signal level of the sub-frame 2 is set as $V_{sig2}$, the brightness is defined as:

$$L = L1 + L2$$
$$= DR1 \times V_{sig1} + DR2 \times V_{sig2}$$

As described above, in the image signal processing circuit (image signal processing method) according to embodiment 1, an image information synthesizing process is not performed and a method for performing sub-frame display which displays a plurality of images into which a gradation representation range is divided into sub-frame units as they are is adopted. Then, since a plurality of items of the input image information are optically added in the sub-frame display, it is possible to reproduce gradation information during capturing without waste.

In addition, even without using an expensive driving driver or the like with numerous bits, it is possible to linearly represent a subject reflectivity of up to 200[%] while maintaining the ability to represent low gradations. Accordingly, since it is possible to use a driving driver with few bits, it is possible to reduce the system costs. In addition, since the exposure conditions of the subject are reflected in the display conditions and it is possible to make the relationship between the subject reflectivity and display brightness linear, it is possible for the screen display brightness at the time of representing a sub-frame to correctly represent the subject reflectivity of the captured image and reproduction which is close to the original look is possible.

In addition, in the image signal processing circuit (image signal processing method) according to embodiment 1, a time difference is not generated between the acquired exposure images since two or more types of exposure conditions are set with respect to an arbitrary pixel group and signal separation is performed for each exposure condition. Accordingly, it is possible to suppress the generation of video ghosting which is caused by the time difference between the acquired images. In addition, it is possible to realize an HDR film display at a low cost.

Figure 8:
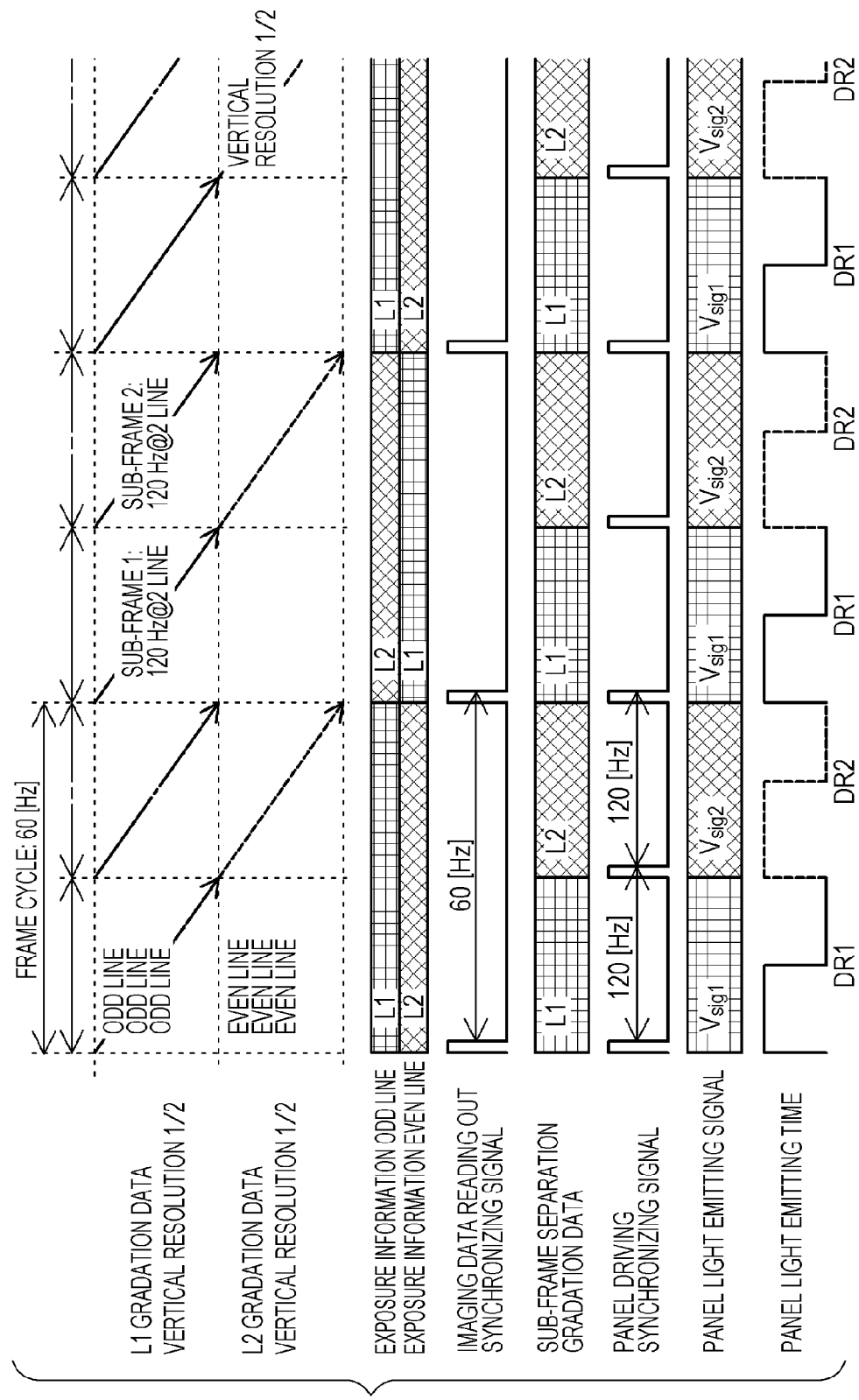
FIG. 8 is a diagram which shows driving timing of a display panel in a case where a sub-frame display operation is performed.

Regarding the driving timing of the display panel in a case of performing the operation of the sub-frame display, it is desirable to carry out the operation as in the timing example shown in FIG. 8. In the present embodiment, since the vertical resolution of the image information which is output from the imaging section 2 is ½, when the image display is performed without changing the timing, the size of the image is only compressed in the vertical direction. In order to avoid this problem, a driving method which performs an image interpolation process or the like in the vertical direction and carries out the sub-frame operation with the full size data may be adopted.

However, when this driving method is adopted, the electric power consumption increases and it is difficult to secure a correction time (for example, the correction time of the threshold correction described above) which is necessary in a light emitting device such as an organic EL element due to the driving frequency or the like of the display panel increasing. In order to avoid these problems, in the present embodiment, a driving method which performs a display video by simultaneously performing writing and scanning for two lines with respect to the display panel is adopted.

Figure 9A:
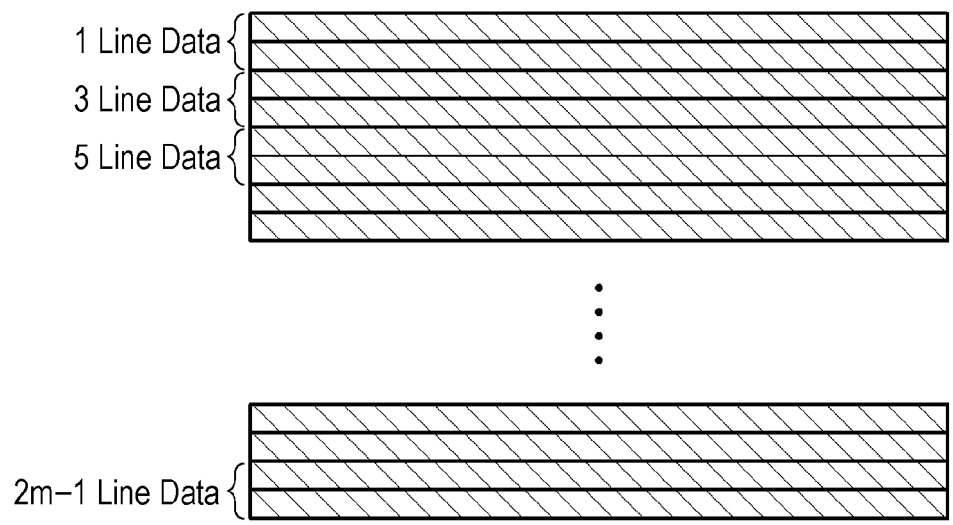
FIG. 9A is a diagram which provides an illustration of a two line simultaneous scanning operation of the sub-frame 1 and FIG. 9B is a diagram which provides an illustration of a two line simultaneous scanning operation of the sub-frame 2.
Figure 9B:
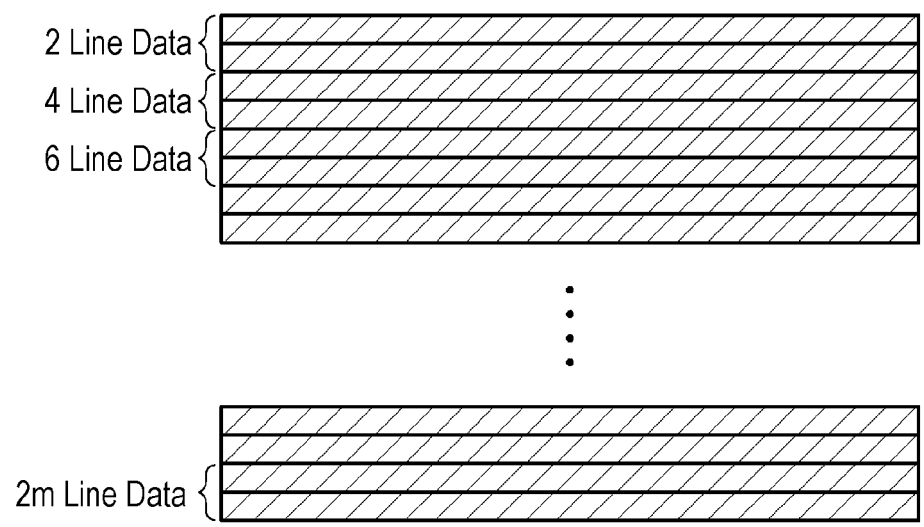

FIG. 9A shows a two line simultaneous scanning operation of the sub-frame 1. In the sub-frame 1, the operation is a two line simultaneous scanning operation regarding pixel information of odd numbered lines where the exposure condition of long time accumulation (long time photographic exposure) is applied. FIG. 9B shows a two line simultaneous scanning operation of the sub-frame 2. In the sub-frame 2, the operation is a two line simultaneous scanning operation regarding pixel information of even numbered lines where the exposure condition of short time accumulation (short time photographic exposure) is applied. By adopting a driving method for a two line simultaneous scanning operation, resolution sensitivity in the vertical direction is slightly inferior to that in a case of generating a full size image using image interpolation or the like; however, it is possible to sufficiently realize the image quality in the film display.

Embodiment 2

Embodiment 2 is a modified example of embodiment 1. In the case of embodiment 1, in principle, the pixel information EV1 and the pixel information EV2 are data where an image is shifted by one line in the vertical direction. Therefore, there is no problem regarding an image with a high correlation between adjacent lines; however, there is a possibility that image quality defects will be generated in a case of an image with a low correlation. Embodiment 2 is for avoiding the generation of image quality defects.

FIG. 10 is a block diagram which shows a configuration of an image signal processing circuit according to embodiment 2. A system which does not use information of adjacent lines for sub-frame generation is adopted in the image signal processing circuit 80 according to embodiment 2 in order to solve the problem of the embodiment 1, that is, the problem that there is a possibility that image quality defects will be generated in a case of an image with a low correlation.

In detail, as shown in FIG. 10, the sub-frame signal generating section 82 has a D range detecting section 825 which detects the maximum gradation value which is able to be acquired in the imaging device 50, that is, a bit D (dynamic) range of imaging side data. Then, the sub-frame signal generating section 82 calculates sub-frame data using a bit D range detected by the D range detecting section 825 in addition to the exposure conditions or the like.

Description will be given of a specific operation of the image signal processing circuit 80 according to embodiment 2 below. As described above, the difference between embodiment 1 and embodiment 2 is the method of generating sub-frame data. In detail, in embodiment 1, a configuration is adopted which gives an exposure image $EV_{-i-1}$ of a sub-frame which is one sub-frame previous, which is output from the sub-frame buffer section 822, to the multiplier 824. In contrast to this, in embodiment 2, a configuration is adopted which gives a maximum D range DEV of the exposure image $EV_{-i}$ which is detected in the D range detecting section 825 instead of the exposure image $EV_{-i-1}$ of a sub-frame which is one sub-frame previous, to the multiplier 824.

Then, based on the maximum D range $DEV_{-i}$ and exposure conditions $EVR_{-i}$ of the exposure image $EV_{-i}$, sub-frame data is generated from the exposure image $EV_{-i}$ according to the following conditional formula.

$$\text{Sub-frame data } i = \text{if } (\text{MAX}(EV_{-i}) > DEV_{-i}) \{EV_{-i} - DEV_{-i} \times EVR_{-i}\} \text{ else } \{EV_{-i}\}$$

Figure 11A:
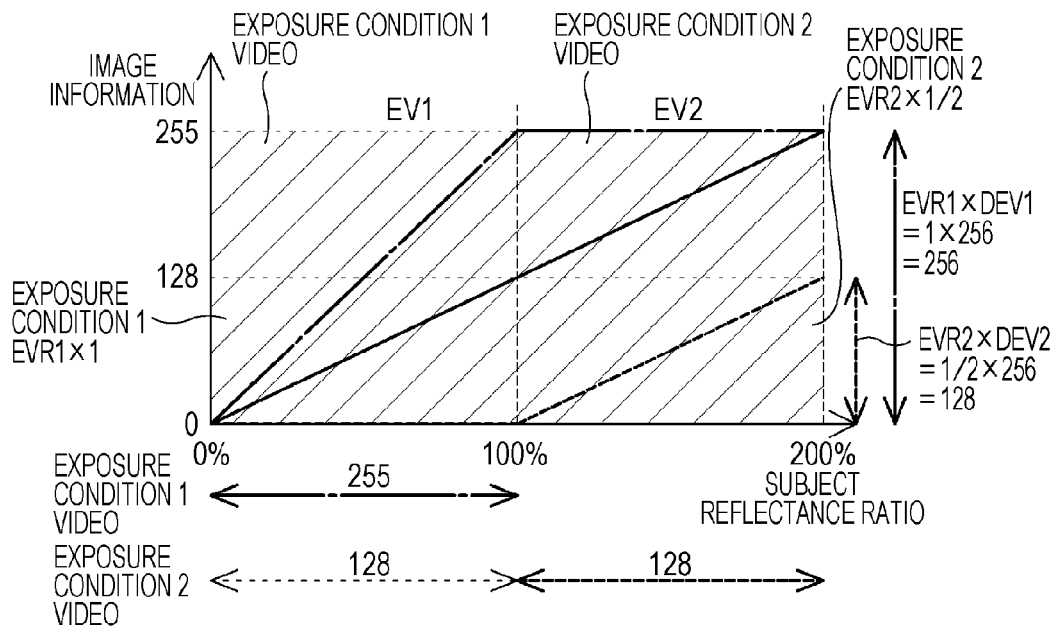
FIGS. 11A and 11B are diagrams which illustrate a summary of a data generation example of a sub-frame signal of embodiment 2.
Figure 11B:
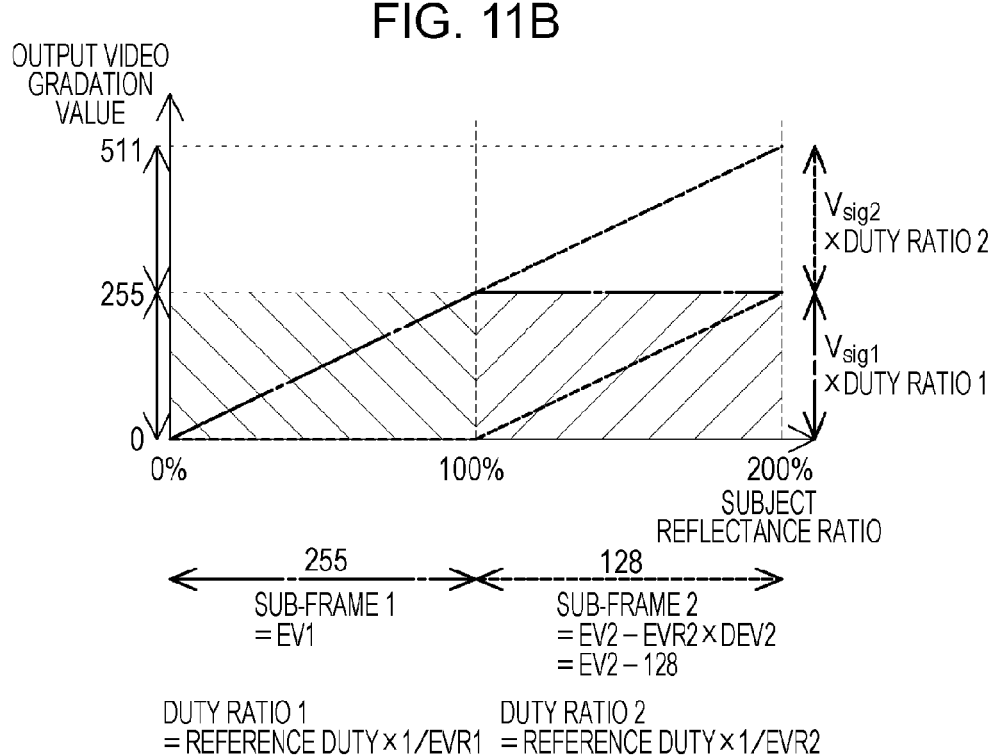

Specific calculation examples are shown in FIGS. 11A and 11B. FIG. 11A shows characteristics of subject reflectivity-image information and FIG. 11B shows characteristics of subject reflectivity-output video gradation value. The maximum D range DEV of the exposure image EV1 and the exposure image EV2 is detected in the D range detecting section 825 and a value of 256 is obtained as a D range $DEV_{-i}$. In general, the maximum D range is regulated by the data format or the like which is used in many cases. Accordingly, it is possible to use a fixed value instead of using a detected value as in the present embodiment.

Based on the value and exposure conditions of the D range $DEV_{-i}$ which are determined as above, the generation of sub-frame data is performed according to the conditional formula described above. In the sub-frame 1, DEV1×EVR1 is 256 which is greater than the maximum value 255 of the exposure image EV1. Accordingly, in order to fit the else condition of the formula described above, sub-frame data 1=exposure image EV1. In the sub-frame 2, DEV2×EVR2 is 128 and since this is smaller than the maximum value 255 of the exposure image EV2, sub-frame data 2=exposure image EV2-128 according to the condition of the formula described above.

As described above, in the image signal processing circuit 80 according to embodiment 2, sub-frame data is generated according to the conditional formula described above, that is, in addition to exposure conditions or the like, sub-frame data is set using the maximum gradation value which is able to be acquired in the imaging device 50. Due to this, it is possible to avoid the problem of embodiment 1, that is, image quality defects which are generated in the case of the data generation system of embodiment 1 where the image is shifted by one line in the vertical direction.

Embodiment 3

Figure 13:
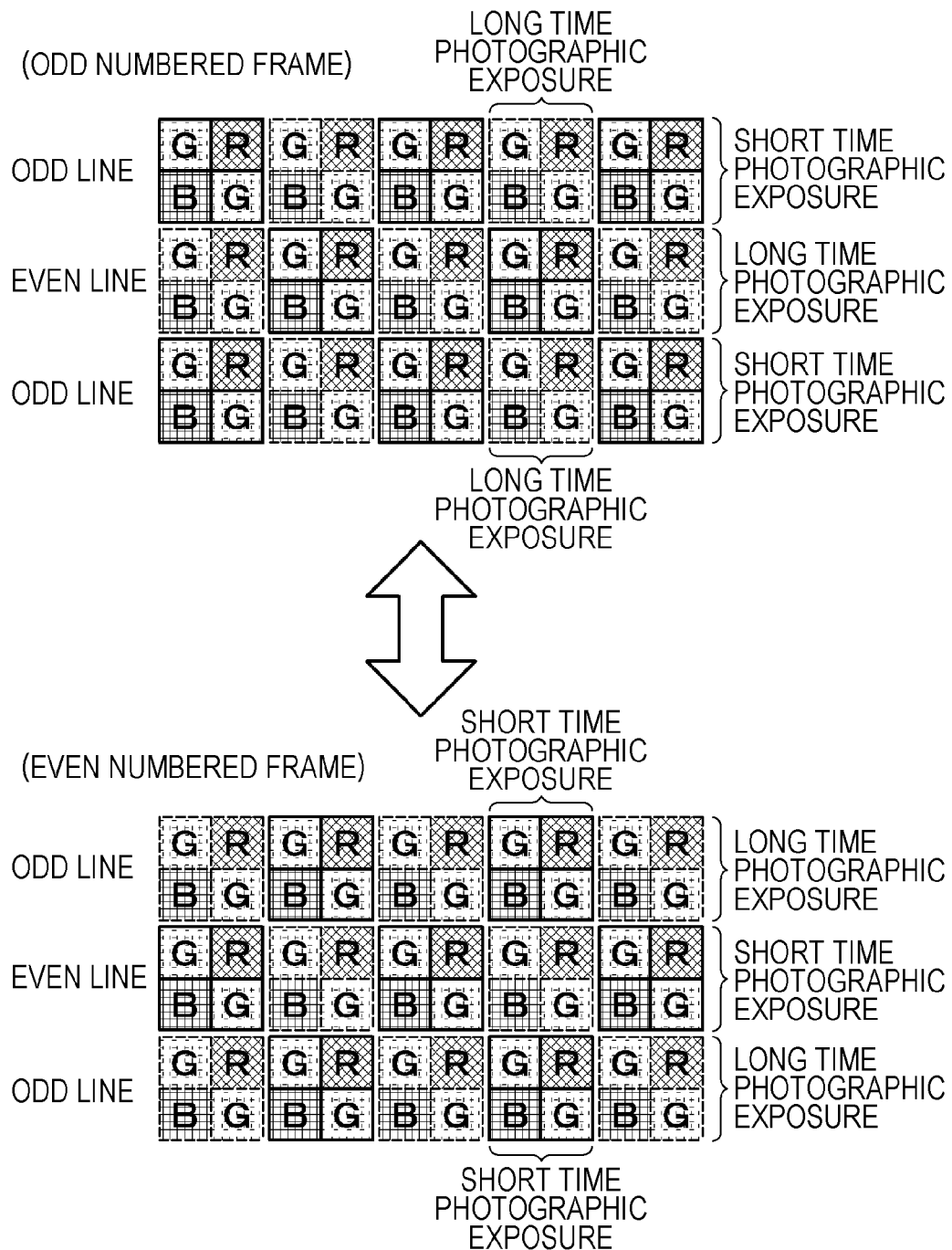
FIG. 13 is a diagram which shows reading out examples in a case where photographic exposure conditions are set using pixels or pixel group units and the exposure conditions are switched using imaging frame units.

Embodiment 3 is an example where exposure control of the imaging section (imaging apparatus) 2 is dynamically carried out and where sub-frame display is performed based on the image information which is acquired under the dynamic exposure control. FIG. 12 and FIG. 13 show examples of reading out pixel information from the imaging section 2.

FIG. 12 is a diagram which shows reading out examples in a case where photographic exposure conditions are set using line units and the exposure conditions are switched using imaging frame units. As shown in FIG. 12, an arbitrary pixel group inside the imaging area section 52 (refer to FIG. 4A) of the imaging device 50 has a configuration which is formed of an odd numbered line pixel group and an even numbered line pixel group. Then, it is possible to alternately switch the setting of exposure conditions with respect to the odd numbered line pixel group and the setting of exposure conditions with respect to the even numbered line pixel group in imaging frame units.

FIG. 13 is a diagram which shows reading out examples in a case where photographic exposure conditions are set using pixels or pixel group units and the exposure conditions are switched using imaging frame units. As shown in FIG. 13, an arbitrary pixel group inside the imaging area section 52 of the imaging device 50 has a configuration formed of a first pixel group (for example, four sub pixels GRBG shown with solid lines) and a second pixel group (for example, four sub pixels GRBG shown with broken lines) where different exposure conditions are set and where the first pixel group and the second pixel group are arranged in a checkered pattern shape. Then, it is possible to alternately switch the setting of exposure conditions with respect to the first pixel group and the setting of exposure conditions with respect to the second pixel group in imaging frame units.

Figure 14:
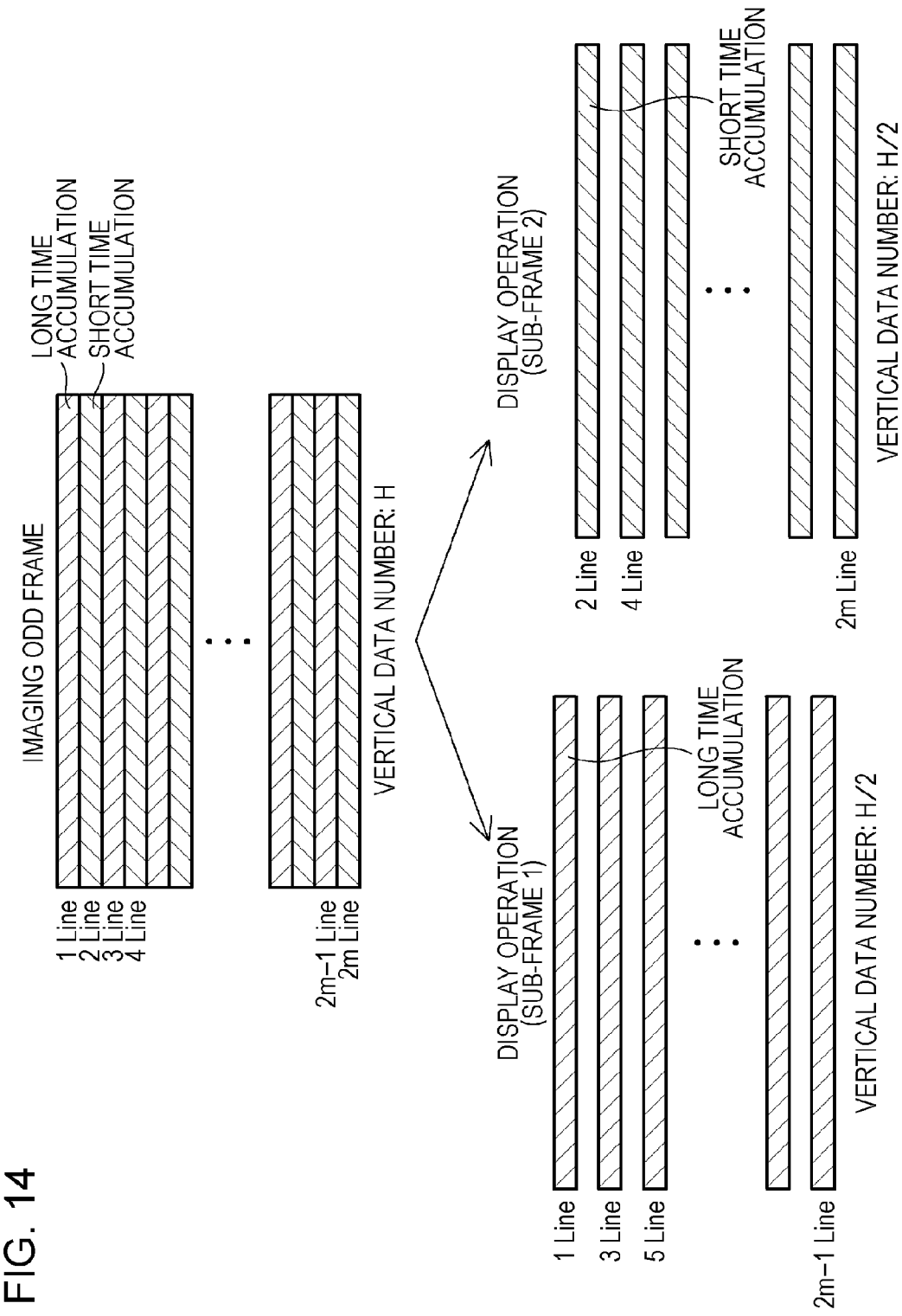
FIG. 14 is a diagram which shows an operation example of reading out and displaying imaging data of odd numbered imaging frames according to embodiment 3.
Figure 15:
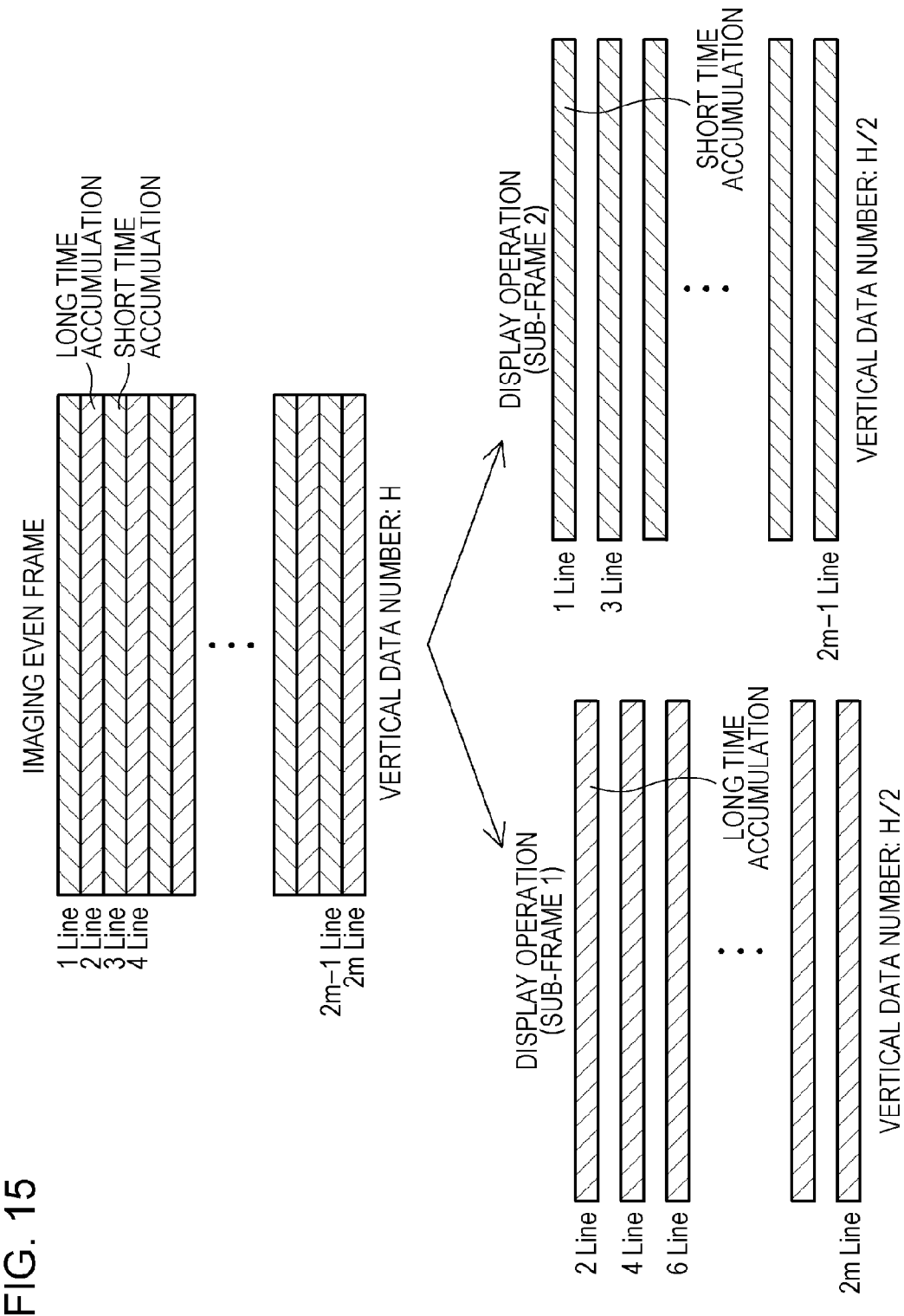
FIG. 15 is a diagram which shows an operation example of reading out and displaying imaging data of even numbered imaging frames according to embodiment 3.

In embodiment 3, for example, as in the reading out examples shown in FIG. 12, two exposure conditions of the imaging device 50 are individually set for the odd numbered lines and the even numbered lines. Then, control which alternately switches the exposure condition settings of the odd numbered line and the even numbered line in imaging frame units is performed in the sensor exposure control section 65 (refer to FIG. 3) of the imaging section 2. FIG. 14 and FIG. 15 show an operation example of reading out and displaying imaging data according to embodiment 3. FIG. 14 is a diagram which shows an operation example of reading out and displaying imaging data of odd numbered imaging frames. FIG. 15 is a diagram which shows an operation example of reading out and displaying imaging data of even numbered imaging frames. In all of the reading examples, the photographic exposure setting is different between long time photographic exposure and short time photographic exposure and the photographic exposure conditions are switched in imaging frame cycles.

Figure 16:
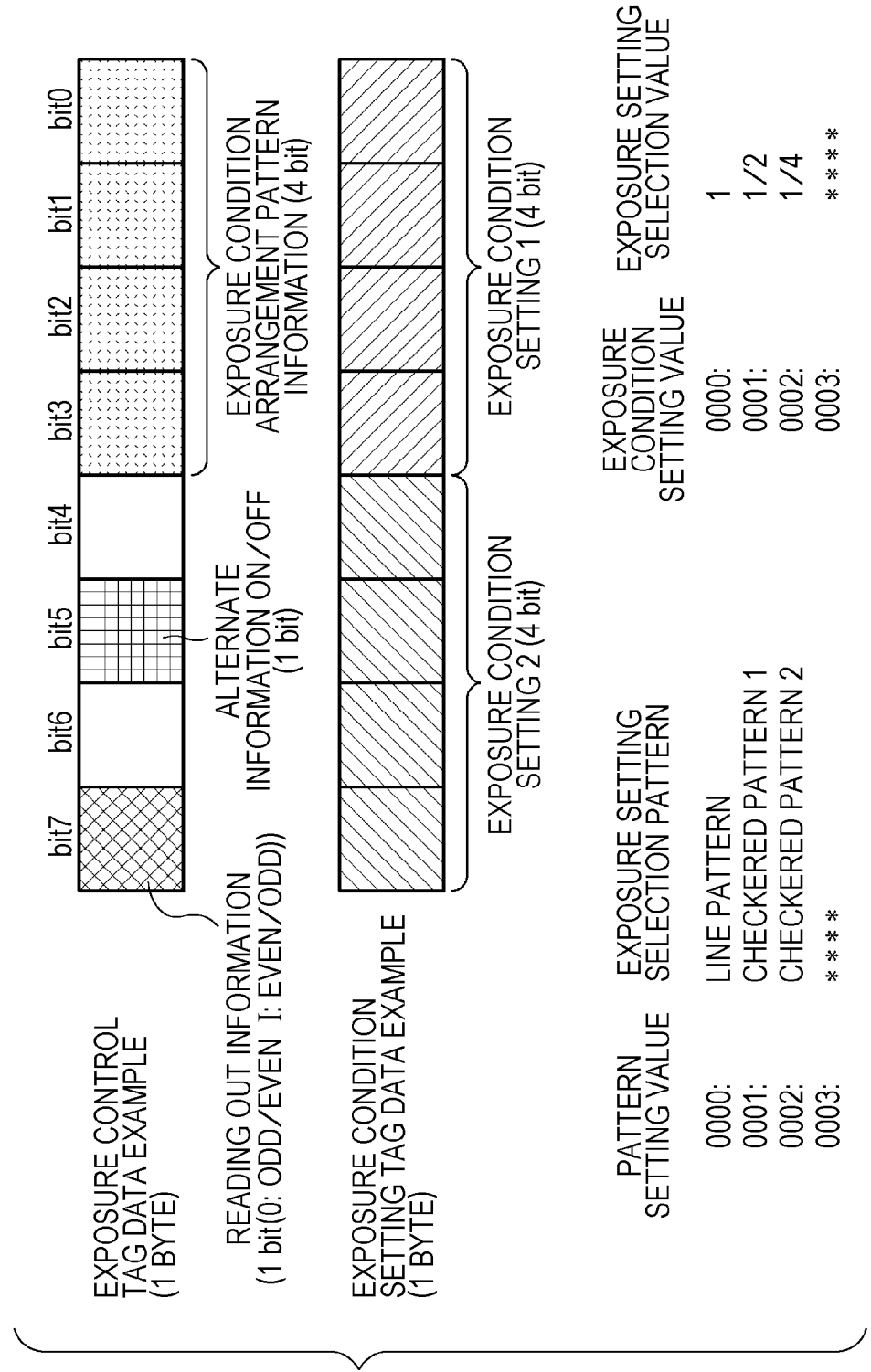
FIG. 16 is a diagram which shows an example of exposure condition identification tag data.

Regarding the corresponding relationship among exposure setting pixel information, exposure conditions, and image data, at the time of outputting the imaging image data from the imaging section 2, identification information such as tag data (exposure condition identification tag data) which enables identification during the latter processes is added to the imaging image data and output. FIG. 16 shows an example of the exposure condition identification tag data.

For example, the exposure condition identification tag data is formed of exposure control tag data and exposure setting tag data.

Then, for example, in exposure control tag data with 1 byte (8 bits), 4 bits (bit 0 to bit 3) are set as exposure condition arrangement pattern information, 1 bit (bit 5) is set as alternate control ON/OFF information, and 1 bit (bit 7) is set as reading out information (0: ODD/EVEN, 1: EVEN/ODD). Regarding the exposure condition arrangement pattern information, for example, an exposure setting selection pattern is set as a line pattern when the pattern setting value is "0000", as a checkered pattern 1 when the pattern setting value is "0001", and as a checkered pattern 2 when the pattern setting value is "0002". In addition, in exposure setting tag data with 1 byte (8 bits), 4 bits (bit 0 to bit 3) are set as an exposure condition setting 1 and 4 bits (bit 4 to bit 7) are set as an exposure condition setting 2. Regarding the exposure condition settings, for example, the exposure setting selection value is set as 1 when the exposure condition setting value is "0000", as ½ when the exposure condition setting value is "0001", as ¼ when the exposure condition setting value is "0002", and as ⅛ when the exposure condition setting value is "0003".

On the other hand, in the display section (the organic EL display apparatus) side, sub-frame display is performed based on the imaging image data from the imaging section 2. A process for the sub-frame display is performed in the same manner as the case of embodiment 1 or embodiment 2. That is, in the image signal processing circuit according to embodiment 1 shown in FIG. 6 or the image signal processing circuit according to embodiment 2 shown in FIG. 10, a process for the sub-frame display described above is performed based on the imaging image data from the imaging section 2.

For example, in the image signal processing circuit according to the embodiment 2, regarding the processes which use exposure condition information, a process is performed based on the tag data described above. Due to this, since sub-frame display is performed by alternately switching exposure condition settings of the odd numbered line and the even numbered line in imaging frame units, the resolution sensitivity in the vertical direction is better than in a case where exposure conditions are fixed in the odd numbered line and the even numbered line.

Embodiment 4

Embodiment 4 is a modified example of embodiment 1 to embodiment 3. In embodiment 1 to embodiment 3, sub-frame display is performed by dividing image information from the imaging section 2 into a low brightness gradation information component (with a subject reflectivity of less than 100[%]) and a high brightness gradation information component (with a subject reflectivity of 100[%] or more). In such a sub-frame display, there is a possibility that a case will occur where the gradation information is concentrated (biased) on one sub-frame due to a specific exposure condition or video information and where there is little gradation information for the other sub-frames. In such a case, flickers are visible, which may lead to deterioration in the image quality.

Figure 17:
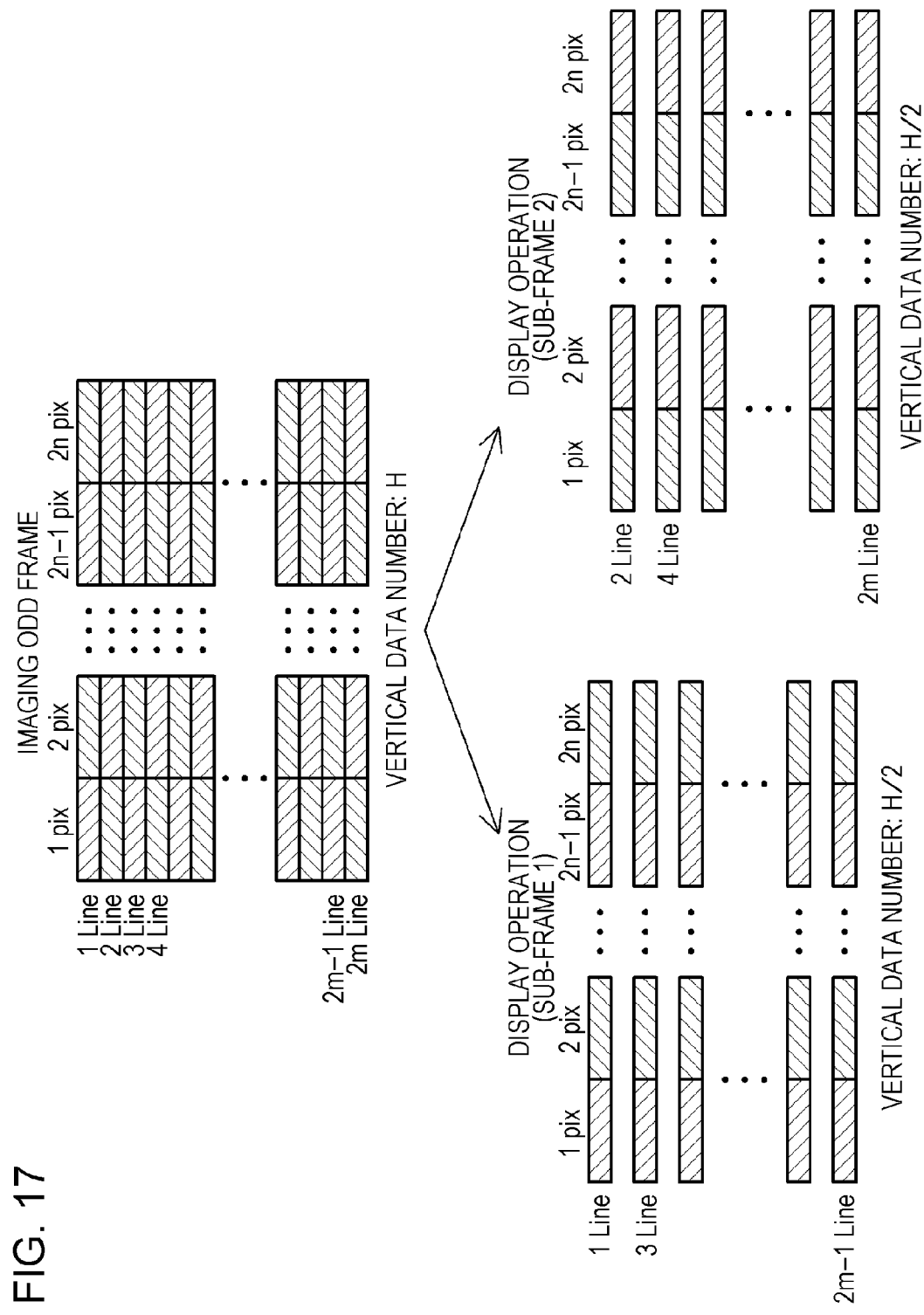
FIG. 17 is a diagram which shows an operation example (one) of reading out and displaying imaging data of odd numbered imaging frames according to embodiment 4.
Figure 18:
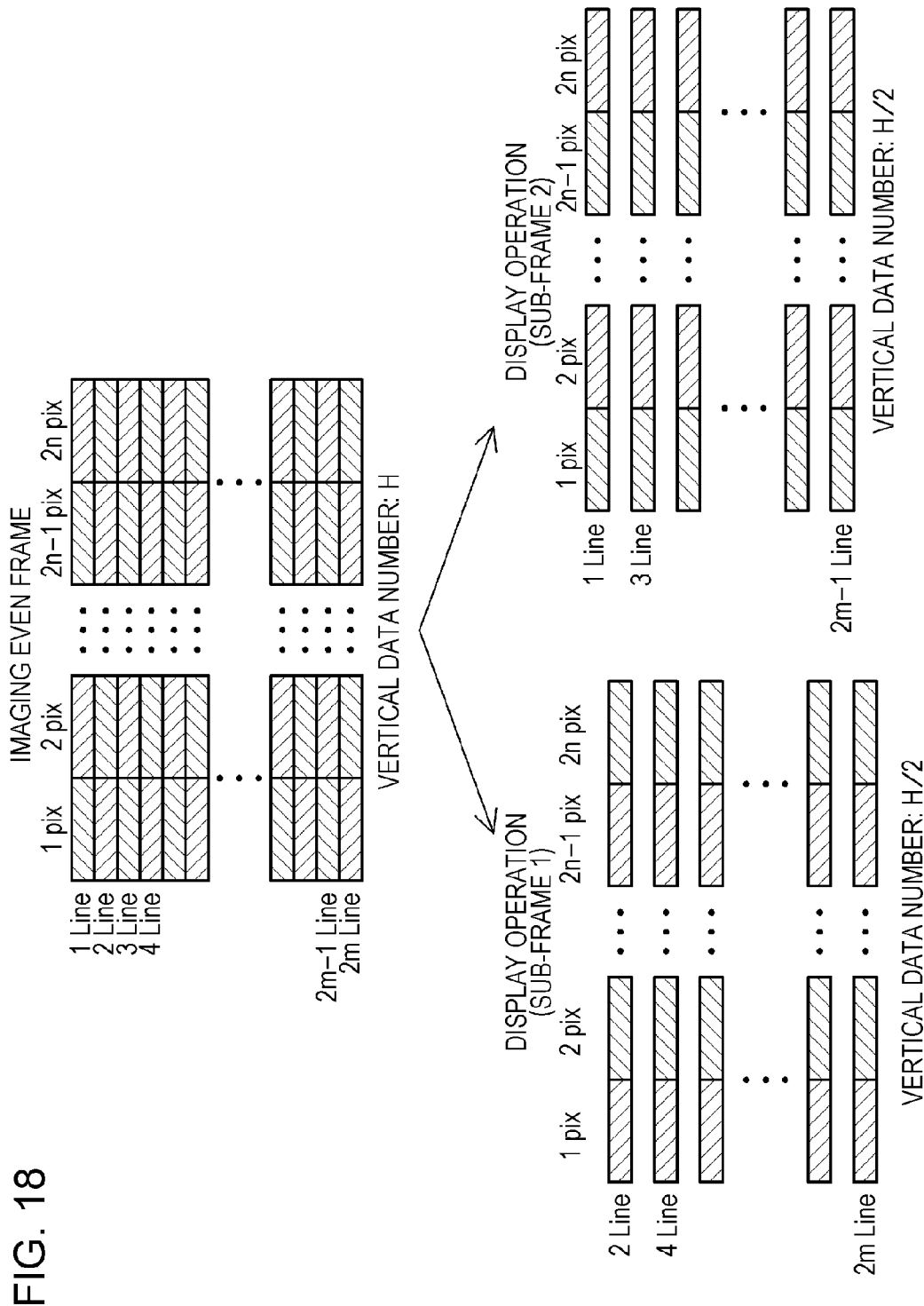
FIG. 18 is a diagram which shows an operation example (two) of reading out and displaying imaging data of even numbered imaging frames according to embodiment 4.

The embodiment 4 is to avoid the image quality deterioration which is caused by the bias of gradation information during representing a sub-frame. Also in embodiment 4, in the same manner as embodiment 3, exposure control of the imaging section (the imaging apparatus) 2 is dynamically carried out and sub-frame display is performed based on the image information which is acquired under the dynamic exposure control. FIG. 17 and FIG. 18 show an operation example (one) of reading out and displaying imaging data according to embodiment 4. FIG. 17 is a diagram which shows an operation example of reading out and displaying imaging data of odd numbered imaging frames. FIG. 18 is a diagram which shows an operation example of reading out and displaying imaging data of even numbered imaging frames.

In embodiment 4, control, which alternately switches the position of a checkered pattern in imaging frame units, is performed in the sensor exposure control section 65 (refer to FIG. 3) of the imaging section 2 along with setting two types of exposure conditions in a checkered pattern as shown in the lower column in FIG. 17 and FIG. 18 and performing reading out for each odd numbered line and even numbered line. Then, on the display section (organic EL display apparatus) side, sub-frame display is performed based on the imaging image data from the imaging section 2.

According to the sub-frame display according to embodiment 4, it is possible to mix a low brightness gradation information component (with a subject reflectivity of less than 100[%]) and a high brightness gradation information component (with a subject reflectivity of 100[%] or more) in one sub-frame. Due to this, since the data has a structure where a low gradation component and a high gradation component are spatially alternately lined up in lines with vertical stripes, it is possible to suppress the bias of the gradation information due to the sub-frame and it is possible to reduce phenomena such as surface flickering.

Figure 19:
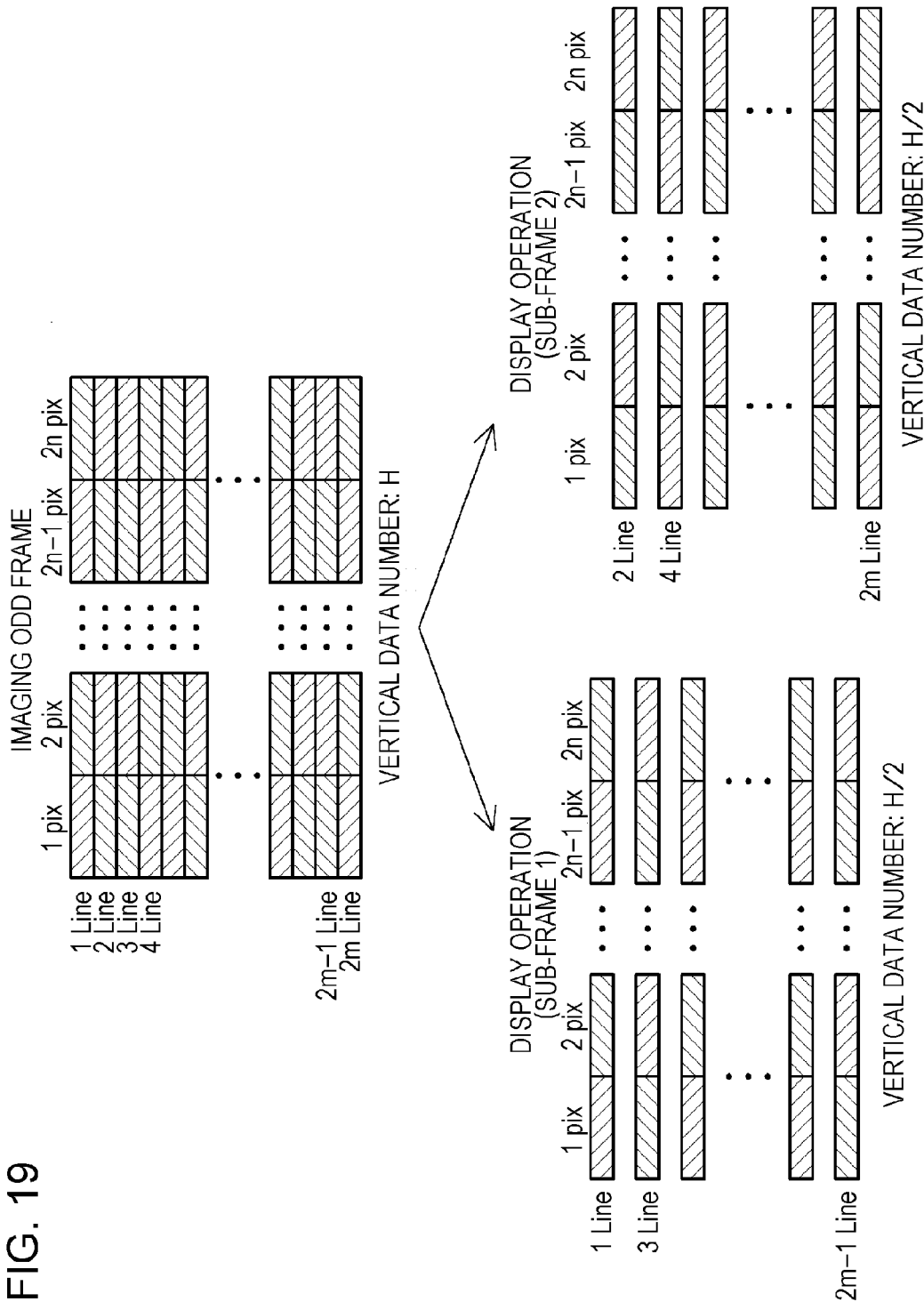
FIG. 19 is a diagram which shows an operation example (one) of reading out and displaying imaging data of odd numbered imaging frames according to embodiment 4.
Figure 20:
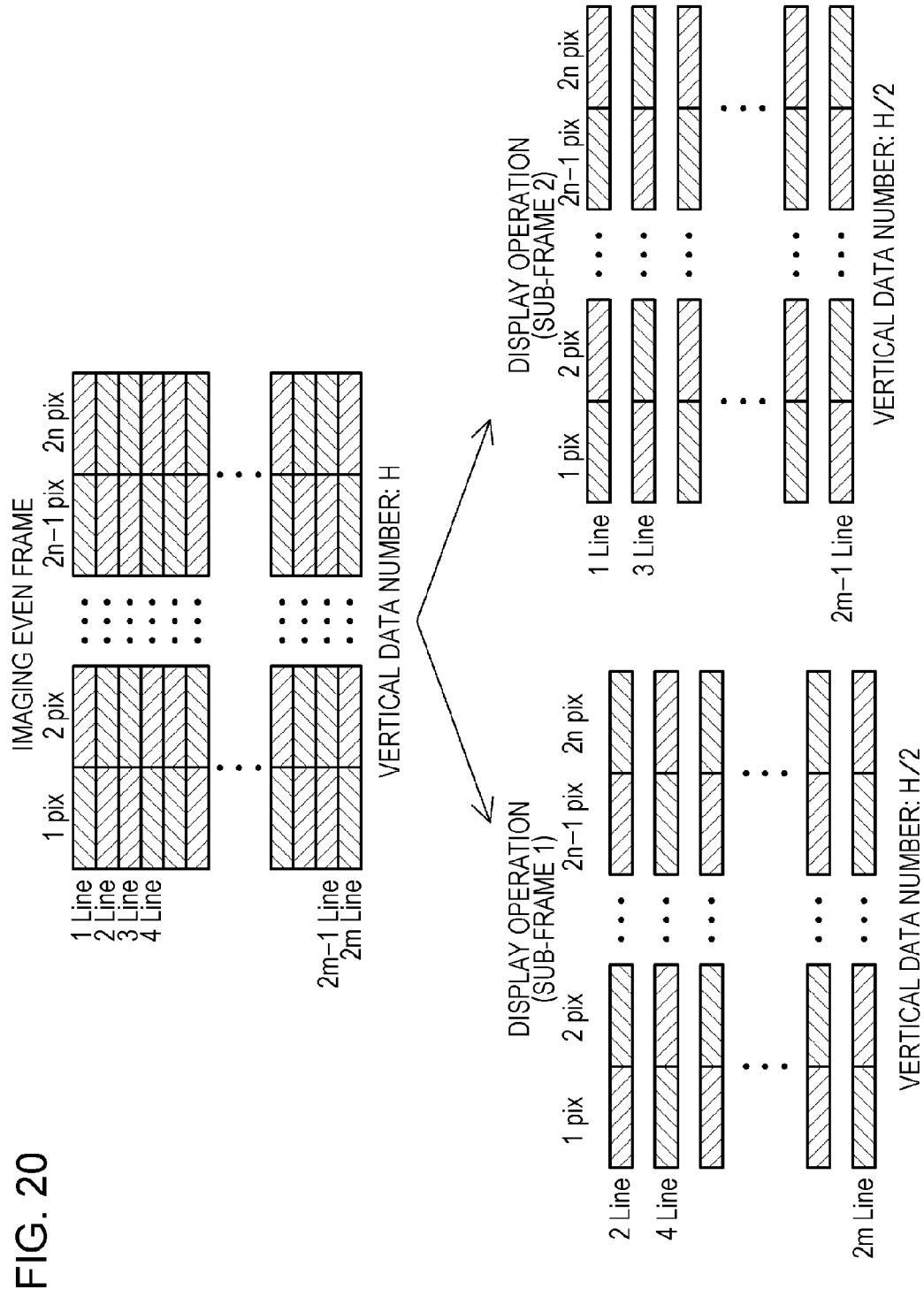
FIG. 20 is a diagram which shows an operation example (two) of reading out and displaying imaging data of even numbered imaging frames according to embodiment 4.

Here, in the checkered pattern as shown in the lower column in FIG. 17 and FIG. 18, there is a possibility that line flickering will be visible due to the influence of the line structure with vertical stripes. Therefore, FIG. 19 and FIG. 20 show an operation example (two) of reading out and displaying imaging data in order to carry out further flicker improvement. FIG. 19 is a diagram which shows an operation example of reading out and displaying imaging data of odd numbered imaging frames. FIG. 20 is a diagram which shows an operation example of reading out and displaying imaging data of even numbered imaging frames.

A checkered pattern where exposure condition setting is possible as shown in FIG. 19 and FIG. 20 is used and the position of the exposure condition setting is alternately controlled in imaging frame units. By introducing such a pattern structure, it is possible to reduce line flickering since the sub-frame itself has a checkered pattern. In a case of embodiment 4, it is not possible to apply duty correction in surface units with regard to the sub-frame correction described in the embodiment 1. Accordingly, in embodiment 4, this may be handled by correcting a signal voltage $V_{sig}$ of a video signal, or so-called $V_{sig}$ correction.

Embodiment 5

Embodiment 5 is a modified example of each of the embodiments described above. In each of the embodiments described above, two line simultaneous writing driving is carried out as the driving of the display panel 10. In the two line simultaneous writing driving, since the first line which is the starting point of the odd numbered lines of the imaging device 50 and the second line which is the starting point of the even numbered lines are the same writing start position on the panel display, there is a concern that so-called position shifting in the image will be visible. Embodiment 5 was made in order to avoid the position shifting in the image which is caused by the first line and the second line being at the same writing start position.

Figure 21:
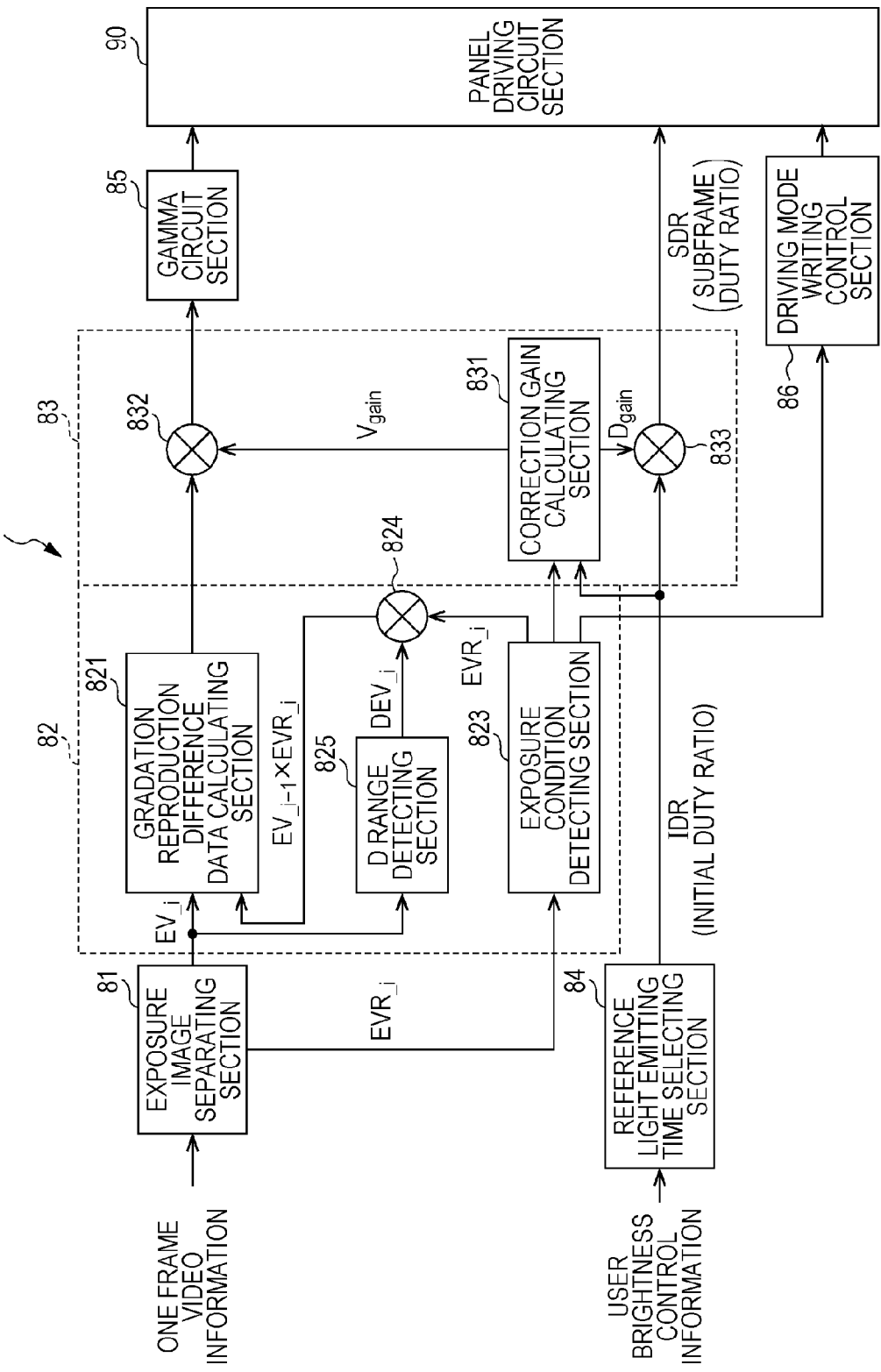
FIG. 21 is a block diagram which shows a configuration of an image signal processing circuit according to embodiment 5.

FIG. 21 is a block diagram which shows a configuration of an image signal processing circuit according to embodiment 5. In embodiment 5, in order to avoid the position shifting in the image which is caused by the first line and the second line being at the same writing start position, the writing start position of the display image is controlled in accordance with each item of reading out information of the odd numbered lines and the even numbered lines of the imaging section 2. In detail, as shown in FIG. 21, the image signal processing circuit 80 according to embodiment 5 has a configuration which has a driving mode writing control section 86 which controls a driving mode of the display panel 10.

Figure 22:
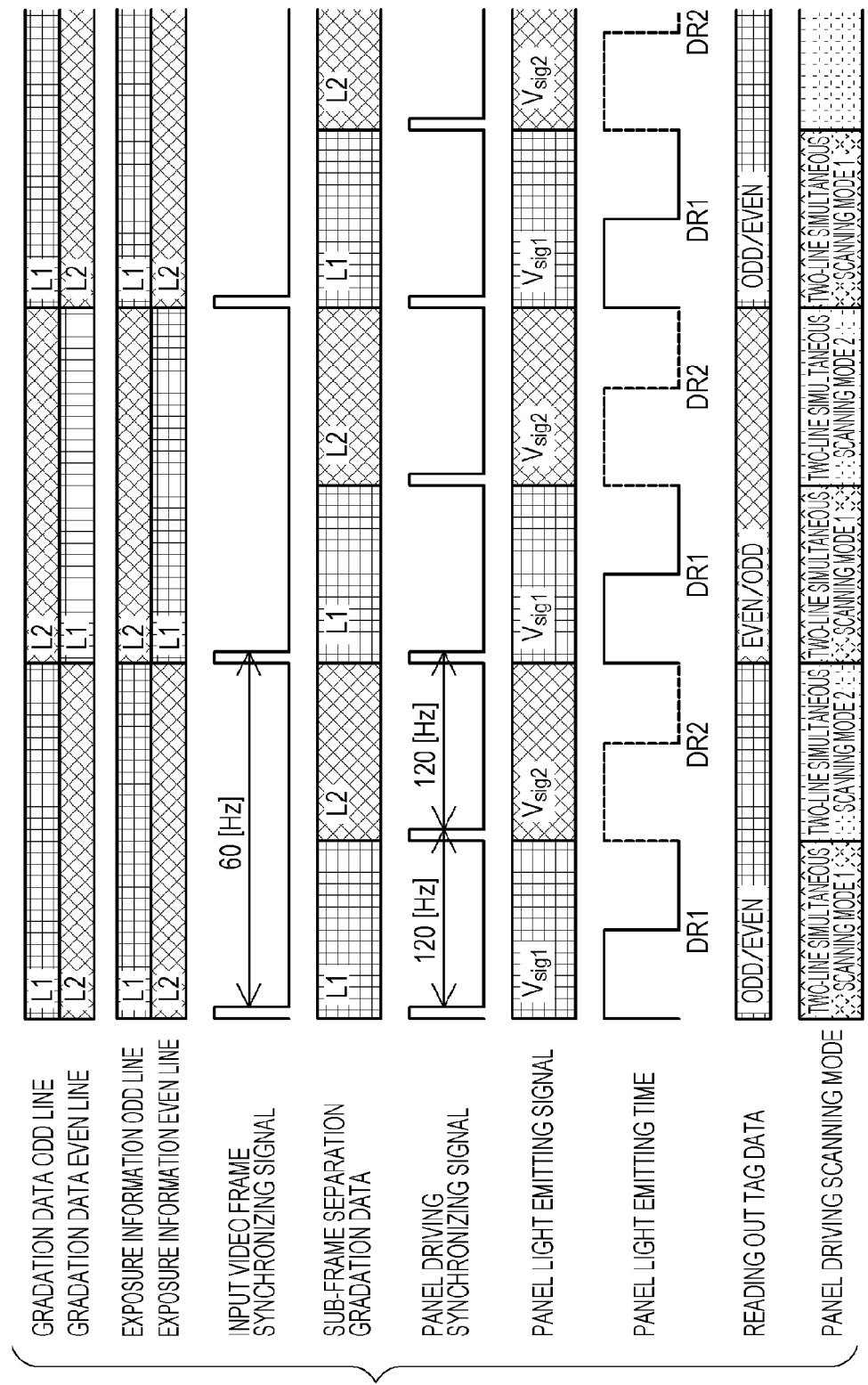
FIG. 22 is a diagram which shows switching timing of a scanning mode in the image signal processing circuit according to embodiment 5.

Below, description will be given of an operation of specific control according to the driving mode writing control section 86 using exposure condition identification tag data or the like shown in FIG. 16. FIG. 22 shows the switching timing of a scanning mode in the image signal processing circuit according to embodiment 5. In the image signal processing circuit 80 according to embodiment 5, by synchronizing the sub-frame control as shown in FIG. 22 under the control of the driving mode writing control section 86, control of the writing scanning mode which controls the writing start position of an display image in sub-frame units during sub-frame display is performed based on reading out information of the odd numbered lines and the even numbered lines.

Figure 23:
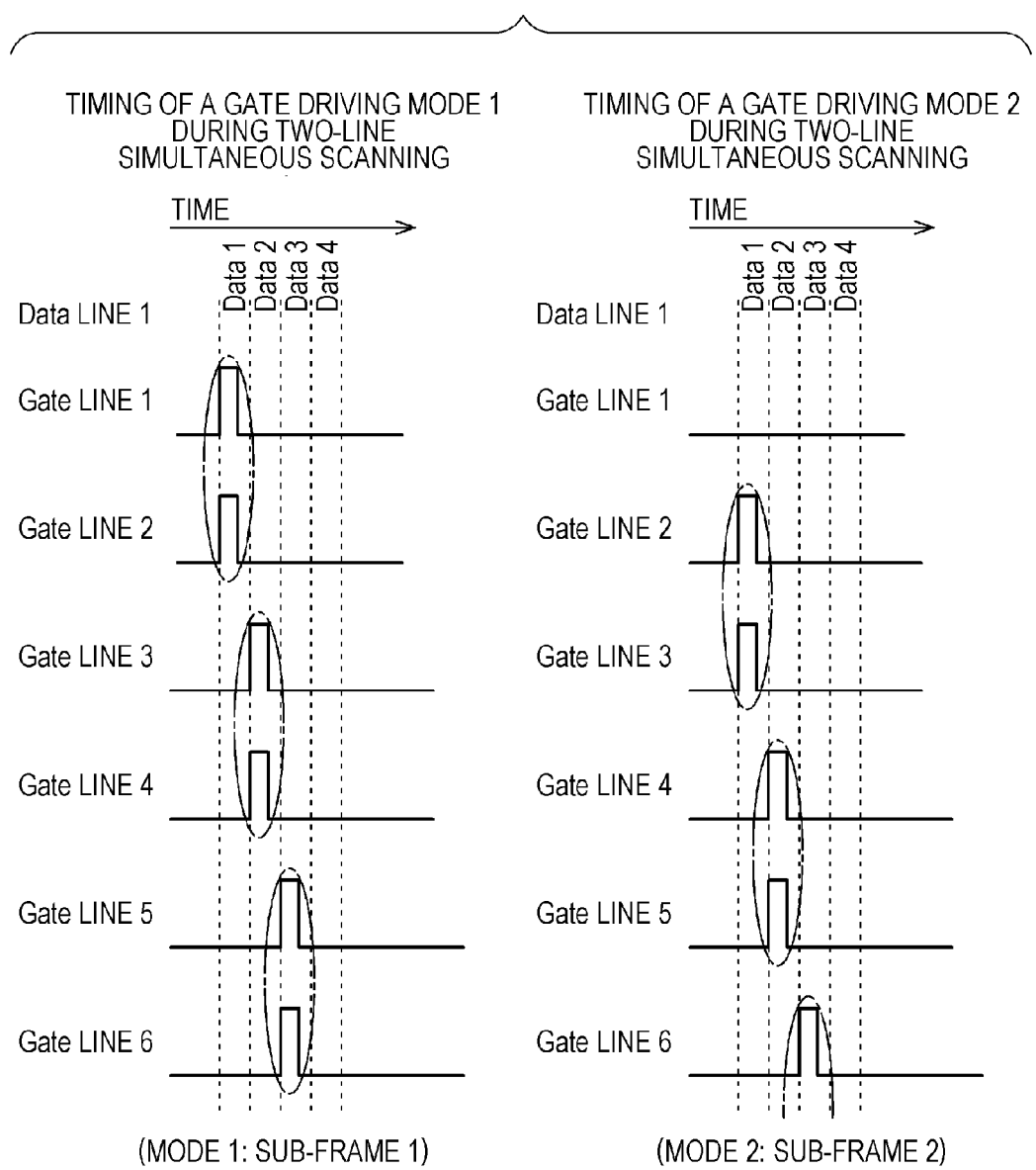
FIG. 23 is a diagram which shows an example of driving a display panel according to embodiment 5.

FIG. 23 shows an example of driving a display panel according to embodiment 5. For example, it is possible to exemplify the display panel 10 shown in FIG. 1 as a display panel. According to the control of the writing scanning mode described above, as shown in FIG. 23, a timing of a writing pulse (which is equivalent to the writing scanning signal WS which is applied to the gate electrode of the sampling transistor 23 in FIG. 2) is controlled, that is, the gate driving mode is switched between mode 1/mode 2 in sub-frame units. Here, the mode 1 is a driving mode of the sub-frame 1 and the mode 2 is a driving mode of the sub-frame 2.

In this manner, based on the reading out information of the odd numbered lines and the even numbered lines, by controlling the writing start position of a display image in sub-frame units during sub-frame display, it is possible to match the relationship between the reading out position of the imaging device 50 and the writing starting position during driving of the display panel 10. Due to this, it is possible to avoid the position shifting in the image which is caused by the first line and the second line of the imaging device 50 being at the same writing start position on the panel display.

Here, in the method described in Japanese Unexamined Patent Application Publication No. 2010-276968, in a case of a simple sub-frame display (displaying in sub-frame units), there is a possibility that a case will occur where gradation information is concentrated on one sub-frame due to a specific exposure condition or video information and where there is little gradation information for the other sub-frames (for example, a black screen). In a case where such gradation information bias occurs, flickering is visible since the frame frequency is ½ on the display and the duty (the ratio of light emitting time and non-light emitting time of the light emitting element) is 50% or less and there are cases where a deterioration in image quality occurs.

Modified Example

In each of the embodiments described above, a configuration is adopted where a process of calculating the exposure ratio EVR is performed in the exposure image separation section 81 which separates one frame of video information into exposure images which are imaged using individual exposure conditions; however, the present disclosure is not limited thereto. For example, it is possible to adopt a configuration which is provided with an exposure ratio calculation section separate from the exposure image separation section 81 and which calculates the exposure ratio EVR in the exposure ratio calculation section.

Here, the present disclosure is also able to adopt the following configurations.

[1] An imaging apparatus including an imaging device which is able to individually set two or more types of exposure conditions with respect to arbitrary pixel groups inside an imaging area section and which reads out an imaging signal, which is obtained from pixel groups where the exposure conditions are individually set, in units of one imaging frame, and an imaging signal processing section which performs signal separation for each exposure condition and performs association with the exposure conditions with respect to the imaging signal which is output from the imaging device.

[2] The imaging apparatus according to [1] described above, in which the imaging device is able to switch settings of the exposure conditions in imaging frame units.

[3] The imaging apparatus according to [1] or [2] described above in which the arbitrary pixel groups inside the imaging area section are formed of a pixel group of odd numbered lines and a pixel group of even numbered lines.

[4] The imaging apparatus according to [3] described above in which the imaging device is able to alternately switch settings of the exposure conditions with respect to the pixel group of the odd numbered lines and the setting of the exposure conditions with respect to the pixel group of the even numbered lines in imaging frame units.

[5] The imaging apparatus according to [1] or [2] described above in which the arbitrary pixel groups inside the imaging area section are formed of a first pixel group and a second pixel group where different exposure conditions are set, and the first pixel group and the second pixel group are arranged in a checkered pattern.

[6] The imaging apparatus according to [5] described above in which the imaging device is able to alternately switch the settings of the exposure conditions with respect to the first pixel group and the settings of the exposure conditions with respect to the second pixel group in imaging frame units.

[7] An imaging signal processing circuit for an imaging device which is able to individually set two or more types of exposure conditions with respect to arbitrary pixel groups inside an imaging area section, the circuit including a signal processing section which performs signal separation for each exposure condition and performs association with the exposure conditions with respect to an imaging signal which is obtained from pixel groups where exposure conditions are individually set and which is read out in units of one imaging frame.

[8] An imaging signal processing method for an imaging device which is able to individually set two or more types of exposure conditions with respect to arbitrary pixel groups inside an imaging area section, the method including performing signal separation for each exposure condition and performing association with the exposure conditions with respect to an imaging signal which is obtained from pixel groups where exposure conditions are individually set and which is read out in units of one imaging frame.

[9] A display apparatus including a sub-frame signal generating section which generates a video signal of a plurality of sub-frames which configure a video of one display frame, and a driving section which performs display with respect to a display panel using sub-frame units based on the video signal of a plurality of sub-frames generated in the sub-frame signal generating section, in which the sub-frame signal generating section inputs an imaging signal which is obtained from pixel groups where exposure conditions are individually set, which is signal separated for each exposure condition, and which is associated with the exposure conditions, as an image signal of a processing target in units of one display frame, in an imaging device which is able to individually set two or more types of exposure conditions with respect to arbitrary pixel groups inside an imaging area section, and generates a video signal of sub-frames by controlling a light emitting time of a light emitting element for each sub-frame according to the associated exposure conditions.

[10] The display apparatus according to [9] described above in which the driving section controls light emitting brightness of the light emitting element per unit of time for each sub-frame according to a video signal of a plurality of sub-frames.

[11] The display apparatus according to [9] or [10] described above in which, when the arbitrary pixel groups inside the imaging area section are formed of a pixel group of odd numbered lines and a pixel group of even numbered lines, the sub-frame signal generating section generates a video signal of a plurality of sub-frames based on an imaging signal obtained from the pixel group of the odd numbered lines and an imaging signal obtained from the pixel group of the even numbered lines, and the driving section performs two line simultaneous scanning driving with respect to the display panel based on the video signal of a plurality of sub-frames.

[12] The display apparatus according to [11] described above in which the driving section controls the writing start position of the display image using sub-frame units based on reading out information for odd numbered lines and even numbered lines.

[13] The display apparatus according to [9] described above in which the sub-frame signal generating section controls a duty of the light emitting element for each sub-frame according to exposure conditions.

[14] The display apparatus according to [13] described above, in which the sub-frame signal generating section performs duty control of the light emitting element using a value obtained by multiplying the reciprocal of a ratio of the exposure time between images for each exposure condition.

[15] The display apparatus according to any one of [9] to [14] in which the sub-frame signal generating section generates a video signal of sub-frames which are divided into a low brightness gradation information component and a high brightness gradation information component.

[16] The display apparatus according to [9] described above in which the sub-frame signal generating section generates a video signal of sub-frames using a maximum gradation value which is able to be acquired in the imaging device in addition to the exposure conditions.

[17] The display apparatus according to [16] described above in which the sub-frame signal generating section mixes the low brightness gradation information component and the high brightness gradation information component in one sub-frame.

[18] The display apparatus according to [9] described above in which the sub-frame signal generating section generates a video signal of sub-frames based on an imaging signal, which is output from an imaging device by alternately switching settings of exposure conditions with respect to a pixel group of odd numbered lines and settings of exposure conditions with respect to a pixel group of even numbered lines in imaging frame units.

[19] An image signal processing circuit including a sub-frame signal generating section which generates a video signal of a plurality of sub-frames which configure a video of one display frame, in which the sub-frame signal generating section inputs an imaging signal which is obtained from pixel groups where exposure conditions are individually set, which is signal separated for each exposure condition, and which is associated with the exposure conditions, as an image signal of a processing target in units of one display frame, in an imaging device which is able to individually set two or more types of exposure conditions with respect to arbitrary pixel groups inside an imaging area section, and generates a video signal of sub-frames by controlling a light emitting time of a light emitting element for each sub-frame according to the associated exposure conditions.

[20] An image signal processing method for an imaging device which is able to individually set two or more types of exposure conditions with respect to arbitrary pixel groups inside an imaging area section when generating a video signal of a plurality of sub-frames which configure a video of one display frame, the method including inputting an imaging signal which is obtained from pixel groups where exposure conditions are individually set, which is signal separated for each exposure condition, and which is associated with the exposure conditions, as an image signal of a processing target in units of one display frame, and generating a video signal of sub-frames by controlling a light emitting time of a light emitting element for each sub-frame according to the associated exposure conditions.

It should be understood by those skilled in the art that various modifications, combinations, sub-combinations and alterations may occur depending on design requirements and other factors insofar as they are within the scope of the appended claims or the equivalents thereof.

What is claimed is:

1. A display apparatus comprising:
a sub-frame signal generating section which generates a video signal of a plurality of sub-frames which configure a video of one display frame; and
a driving section which performs display with respect to a display panel using sub-frame units based on the video signal of a plurality of sub-frames generated in the sub-frame signal generating section,
wherein the sub-frame signal generating section inputs an imaging signal which is obtained from pixel groups where exposure conditions are individually set, which is signal separated for each exposure condition, and which is associated with the exposure conditions, as an image signal of a processing target in units of one display frame, in an imaging device which is able to individually set two or more types of exposure conditions with respect to arbitrary pixel groups inside an imaging area section, and
generates a video signal of sub-frames by controlling a light emitting time of a light emitting element for each sub-frame according to the associated exposure conditions.

2. The display apparatus according to claim 1,
wherein the driving section controls light emitting brightness of the light emitting element per unit of time for each sub-frame according to a video signal of a plurality of sub-frames.

3. The display apparatus according to claim 1,
wherein, when the arbitrary pixel groups inside the imaging area section are formed of a pixel group of odd numbered lines and a pixel group of even numbered lines,
the sub-frame signal generating section generates a video signal of a plurality of sub-frames based on an imaging signal obtained from the pixel group of the odd numbered lines and an imaging signal obtained from the pixel group of the even numbered lines, and
the driving section performs two line simultaneous scanning driving with respect to the display panel based on the video signal of a plurality of sub-frames.

4. The display apparatus according to claim 3,
wherein the driving section controls the writing start position of the display image using sub-frame units based on reading out information for odd numbered lines and even numbered lines.

5. The display apparatus according to claim 1,
wherein the sub-frame signal generating section controls a duty of a light emitting element for each sub-frame according to exposure conditions.

6. The display apparatus according to claim 5,
wherein the sub-frame signal generating section performs duty control of the light emitting element using a value obtained by multiplying the reciprocal of a ratio of the exposure time between images for each exposure condition.

7. The display apparatus according to claim 1,
wherein the sub-frame signal generating section generates a video signal of sub-frames which are divided into a low brightness gradation information component and a high brightness gradation information component.

8. The display apparatus according to claim 1,
wherein the sub-frame signal generating section generates a video signal of sub-frames using a maximum gradation value which is able to be acquired in the imaging device in addition to the exposure conditions.

9. The display apparatus according to claim 8,
wherein the sub-frame signal generating section mixes the low brightness gradation information component and the high brightness gradation information component in one sub-frame.

10. The display apparatus according to claim 1,
wherein the sub-frame signal generating section generates a video signal of sub-frames based on an imaging signal, which is output from an imaging device by alternately switching settings of exposure conditions with respect to a pixel group of odd numbered lines and settings of exposure conditions with respect to a pixel group of even numbered lines in imaging frame units.

11. An image signal processing circuit comprising:
a sub-frame signal generating section which generates a video signal of a plurality of sub-frames which configure a video of one display frame,
wherein the sub-frame signal generating section
inputs an imaging signal which is obtained from pixel groups where exposure conditions are individually set, which is signal separated for each exposure condition, and which is associated with the exposure conditions, as an image signal of a processing target in units of one display frame, in an imaging device which is able to individually set two or more types of exposure conditions with respect to arbitrary pixel groups inside an imaging area section, and
generates a video signal of sub-frames by controlling a light emitting time of a light emitting element for each sub-frame according to the associated exposure conditions.

12. An image signal processing method for an imaging device which is able to individually set two or more types of exposure conditions with respect to arbitrary pixel groups inside an imaging area section when generating a video signal of a plurality of sub-frames which configure a video of one display frame, the method comprising:
inputting an imaging signal which is obtained from pixel groups where exposure conditions are individually set, which is signal separated for each exposure condition, and which is associated with the exposure conditions, as an image signal of a processing target in units of one display frame; and
generating a video signal of sub-frames by controlling the light emitting time of the light emitting element for each sub-frame according to the associated exposure conditions.

* * * * *